United States Patent
Sakurai et al.

(10) Patent No.: US 10,252,300 B2
(45) Date of Patent: Apr. 9, 2019

(54) CLEANING DEVICE AND CLEANING METHOD FOR HYDRAULIC OIL TUBE IN AIRCRAFT

(71) Applicant: MITSUBISHI HEAVY INDUSTRIES, LTD., Tokyo (JP)

(72) Inventors: Hideaki Sakurai, Tokyo (JP); Yusuke Shimano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 135 days.

(21) Appl. No.: 15/323,898

(22) PCT Filed: May 29, 2015

(86) PCT No.: PCT/JP2015/065515
§ 371 (c)(1),
(2) Date: Jan. 4, 2017

(87) PCT Pub. No.: WO2016/009726
PCT Pub. Date: Jan. 21, 2016

(65) Prior Publication Data
US 2017/0136506 A1    May 18, 2017

(30) Foreign Application Priority Data
Jul. 18, 2014  (JP) ................. 2014-148001

(51) Int. Cl.
*B08B 9/032*     (2006.01)
*B64F 5/00*      (2017.01)
*B64F 5/30*      (2017.01)

(52) U.S. Cl.
CPC ............ *B08B 9/0323* (2013.01); *B08B 9/032* (2013.01); *B08B 9/0325* (2013.01); *B64F 5/00* (2013.01); *B64F 5/30* (2017.01); *B08B 2209/032* (2013.01)

(58) Field of Classification Search
None
See application file for complete search history.

(56) References Cited

U.S. PATENT DOCUMENTS

| 4,137,825 A * | 2/1979 | Leonard | F15B 9/08 |
| | | | 137/625.62 |
| 6,059,528 A * | 5/2000 | Danielson | B64C 11/303 |
| | | | 416/153 |

(Continued)

FOREIGN PATENT DOCUMENTS

| DE | 908834 C | 4/1954 |
| DE | 102006044205 B3 | 1/2008 |

(Continued)

OTHER PUBLICATIONS

PCT/IB/338, "Notification of Transmittal of Translation of the International Preliminary Report on Patentability for International Application No. PCT/JP2015/065515," dated Feb. 2, 2017.

(Continued)

*Primary Examiner* — Eric W Golightly
(74) *Attorney, Agent, or Firm* — Manabu Kanesaka; Benjamin Hauptman; Kenneth Berner

(57) ABSTRACT

A cleaning device of the present invention simultaneously cleans two different hydraulic oil tubes of an aircraft. The cleaning device has a supply flow path, a return flow path, a valved connection tube, a connection tube on-off valve and a control section. The supply flow path is connected to a supply end of a first hydraulic oil tube. The return flow path is connected to a supply end of a second hydraulic oil tube. The valved connection tube is arranged between a connection end of the first hydraulic oil tube and a connection end of the second hydraulic oil tube and fluidly connects the first and second hydraulic oil tubes. The connection tube on-off valve is arranged in a flow path of the valved connection (Continued)

tube and controls a flow rate of a cleaning agent flowing through the valved connection tube according to an instruction from the control section.

15 Claims, 21 Drawing Sheets

(56) References Cited

U.S. PATENT DOCUMENTS

| | | | | |
|---|---|---|---|---|
| 2013/0067901 A1* | 3/2013 | Masuda | ............... | E02F 9/16 60/484 |
| 2014/0026597 A1* | 1/2014 | Epstein | ............ | B64D 37/30 62/48.2 |
| 2014/0138328 A1 | 5/2014 | Rodrigues-Morgado | | |
| 2014/0151501 A1 | 6/2014 | Kondo et al. | | |

FOREIGN PATENT DOCUMENTS

| | | |
|---|---|---|
| JP | S60-138207 A | 7/1985 |
| JP | 2000-317417 A | 11/2000 |
| JP | 2002-357283 A | 12/2002 |
| JP | 2005-208712 A | 8/2005 |
| JP | 2008-274871 A | 11/2008 |
| JP | 2013-176735 A | 9/2013 |
| JP | 2014-132189 A | 7/2014 |

OTHER PUBLICATIONS

PCT/IB/373, "International Preliminary Report on Patentability for International Application No. PCT/JP2015/065515," dated Jan. 24, 2017.
PCT/ISA/237, "Written Opinion of the International Searching Authority for International Application No. PCT/JP2015/065515," dated Sep. 1, 2015.
PCT/IB/326, "Notification Concerning Transmittal of International Preliminary Report on Patentability for International Application No. PCT/JP2015/065515," dated Feb. 2, 2017.
Japan Patent Office, "Office Action for Japanese Patent Application No. 2014-148001," dated Aug. 2, 2017.
Europe Patent Office, "Search Report for European Patent Application No. 15822107.7," dated Jun. 8, 2017.
PCT, "International Search Report for International Application No. PCT/JP2015/065515" dated Sep. 1, 2015.

* cited by examiner

Fig. 5

| No. | SYSTEM | VALVE OPERATION (×:CLOSED, ○:OPENED) | | | | | PORT | |
|---|---|---|---|---|---|---|---|---|
| | | R-5 | R-7 | | | | Press | Ret |
| 1 | Left | × | ○ | | | | AO | AN |
| 2 | | ○ | × | | | | AO | AN |
| 3 | | ○ | ○ | | | | AO | AN |

Fig. 11

| No. | SYSTEM | VALVE OPERATION (×:CLOSED, ○:OPENED) | | | | | PORT | |
|---|---|---|---|---|---|---|---|---|
| | | L-1 | L-5 | L-8 | | | Press | Ret |
| 1 | Right | × | × | ○ | | | V | U |
| 2 | | × | ○ | × | | | V | U |
| 3 | | ○ | × | × | | | V | U |
| 4 | | × | ○ | ○ | | | V | U |

Fig. 15

| No. | SYSTEM | VALVE OPERATION (×:CLOSED, ○:OPENED) | | | | | PORT | |
|---|---|---|---|---|---|---|---|---|
| | | L-6 | L-9 | L-10 | | | Press | Ret |
| 1 | Center | × | × | ○ | | | A | B |
| 2 | | × | ○ | × | | | A | B |
| 3 | | ○ | × | × | | | A | B |
| 4 | | ○ | ○ | ○ | | | A | B |
| 5 | | × | × | × | | | C | B |

Fig. 20

| No. | SYSTEM | VALVE OPERATION (×:CLOSED, ○:OPENED) | | | | | PORT | |
|---|---|---|---|---|---|---|---|---|
| | | L-2 | L-3 | L-4 | L-7 | L-11 | Press | Ret |
| 1 | Left | × | × | × | ○ | × | J | K |
| 2 | | × | × | × | × | ○ | J | K |
| 3 | | × | × | ○ | × | × | J | K |
| 4 | | ○ | × | × | × | × | J | K |
| 5 | | × | ○ | × | × | × | J | K |

Fig. 22

| No. | SYSTEM | VALVE OPERATION (×:CLOSED, ○:OPENED) | | | | | PORT | |
|---|---|---|---|---|---|---|---|---|
| | | R-4 | R-6 | R-9 | R-10 | | Press | Ret |
| 1 | Center | × | ○ | ○ | ○ | | AC | AD |
| 2 | | × | × | × | ○ | | AC | AD |
| 3 | | × | × | ○ | × | | AC | AD |
| 4 | | × | ○ | × | × | | AC | AD |
| 5 | | ○ | × | × | × | | AC | AD |
| 6 | | × | ○ | ○ | ○ | | AC | AD |
| 7 | | × | × | × | × | | AE | AD |

Fig. 23

| No. | SYSTEM | VALVE OPERATION (×:CLOSED, ○:OPENED) | | | | | PORT | |
|---|---|---|---|---|---|---|---|---|
| | | R-1 | R-2 | R-3 | R-8 | R-11 | Press | Ret |
| 1 | Right | × | × | × | ○ | × | AT | AU |
| 2 | | × | × | × | × | ○ | AT | AU |
| 3 | | ○ | × | × | × | × | AT | AU |
| 4 | | × | ○ | × | × | × | AT | AU |
| 5 | | × | × | ○ | × | × | AT | AU |

CLEANING DEVICE AND CLEANING METHOD FOR HYDRAULIC OIL TUBE IN AIRCRAFT

TECHNICAL FIELD

This invention relates to a cleaning device and a cleaning method for hydraulic oil tube arranged in an aircraft airframe.

BACKGROUND ART

Japanese Patent Publication No. 2002-357283 (patent literature 1) discloses an invention of a single lever type water faucet, arranged in an end part of a water supply tube and a hot water supply tube of water service, in which is arranged a piston, inside a tube between the water supply tube and the hot water supply tube, and the water faucet, to avoid occurrence of water hammer. The water hammer preventing device described in the patent literature 1 is arranged in a vicinity of a water faucet of a water supply tube and a hot water supply tube in which a fluid flows in one direction; and is supposed to avoid occurrence of water hammer in the water supply tube and the hot water supply tube.

Japanese Patent Publication No. 2005-208712 (patent literature 2) discloses an invention of a method of opening without water hammer for a fluid flowing passage in which a fluid flows in one direction. In the method of opening without water hammer described in the patent literature 2, a vibration sensor is arranged in an upstream of an actuator operation type valve to detect a vibration Pr; and a control is performed to the actuator operation type valve so that the detected vibration signal Pr becomes approximatively zero. The vibration sensor is arranged in an upstream vicinity of the actuator operation type valve.

Japanese Patent Publication No. 2008-274871 (patent literature 3) discloses a water hammer suppressing device which suppresses water hammers occurring in a main conduit (a flow path in which a fluid flows in one direction) of an inline hydraulic turbine in a hydraulic power plant. The water hammer suppressing device described in the patent literature 3 is provided in a vicinity of the inline hydraulic turbine with a bypass tube, which bypasses the inline hydraulic turbine, and a rupture disc. The water hammer suppressing device described in the patent literature 3 is to suppress water hammers occurring as a result of abruptly suppressing inflow amount into the inline hydraulic turbine, as the rotation speed of the inline hydraulic turbine increases when a power generator of the inline hydraulic turbine is separated from the system, due to an accident or the like; and to verify occurrence of water hammer afterwards.

CITATION LIST

Patent literature 1: Japanese Patent Publication No. 2002-357283
Patent literature 2: Japanese Patent Publication No. 2005-208712
Patent literature 3: Japanese Patent Publication No. 2008-274871

SUMMARY OF THE INVENTION

In an aircraft there are, in addition to main control surfaces such as an aileron, a rudder and an elevator, moving blades such as secondary control surfaces such as a flap, a spoiler, a slat and an air brake, and moving parts such as a retractable gear, a brake, a steering and a thrust reverser. An actuator is connected to each of those moving parts. In a configuration of driving actuators by using hydraulic pressure, hydraulic pressure provided to hydraulic oil tube of supply flow path and return flow path is controlled to drive actuators and operate moving parts. In addition, hydraulic oil tube is connected to hydraulic oil tank, hydraulic pump and the like, as well.

In case of aircrafts, it is common to provide a plurality of independent hydraulic systems, in a safety aspect. Therefore, the quantity of hydraulic oil tube arranged in the wings and in the fuselage inevitably increases. In addition, hydraulic oil tube is provided with many parts such as elbows, joints, junctions, fittings to pass through partition walls and the like, and many processes are required to clean inside the hydraulic oil tube during manufacturing or disassembly repair. Conventionally, cleaning inside a hydraulic oil tube was performed by connecting a cleaning device to each system of hydraulic oil tube and repeating an operation of cleaning inside hydraulic oil tube, an operation of cleaning verification and an operation of switching hydraulic oil tube to be cleaned.

Especially in case of passenger plane, in addition to high quantity of moving parts, hydraulic pumps and the like, distance from a supply end of a hydraulic oil tube to an equipment end is often long, such as 10 to 40 meters. Therefore, switching operation of hydraulic oil tube during cleaning operation required many people and many processes.

An object of the present invention is to provide a cleaning device and a cleaning method to clean a supply flow path and a return flow path of a hydraulic oil tube arranged in an aircraft airframe, in a shorter time.

A cleaning device of the present invention is a cleaning device which simultaneously cleans a first hydraulic oil tube and a second hydraulic oil tube of an aircraft. The cleaning device is provided with a cleaning agent circulation device having: a cleaning agent supply flow path connected to a supply end of the first hydraulic oil tube included in a first hydraulic system; and a cleaning agent return flow path connected to a supply end of the second hydraulic oil tube included in a second hydraulic system. In addition, the cleaning device is provided with: a valved connection tube which is arranged between a connection end of the first hydraulic oil tube and a connection end of the second hydraulic oil tube and fluidly connects the first hydraulic oil tube and the second hydraulic oil tube; a connection tube on-off valve which is arranged in a flow path of the valved connection tube; and a control section. The connection tube on-off valve controls a flow rate of a cleaning agent flowing through the valved connection tube on a basis of an instruction of the control section.

By use of the present invention, a supply flow path and a return flow path of a hydraulic oil tube arranged in an aircraft airframe can be cleaned in a shorter time.

BRIEF DESCRIPTION OF DRAWINGS

Accompanying drawings are incorporated to the present Description in order to aid explanation of embodiments. It should be noted that the present invention should not be interpreted as limited by examples shown in drawings and examples described in the Description.

FIG. 5 is a table diagram to explain on-off operations (Left) of a connection tube on-off valve.

FIG. 11 is a table diagram to explain on-off operations (Right) of a connection tube on-off valve.

FIG. 15 is a table diagram to explain on-off operations (Center) of a connection tube on-off valve to clean a hydraulic oil tube having an odd number supply ends.

FIG. 20 is a table diagram to explain on-off operations of a connection tube on-off valve when cleaning the Left hydraulic oil tube (for example, a hydraulic oil tube arranged in the left wing).

FIG. 22 is a table diagram to explain on-off operations of a connection tube on-off valve when cleaning the Center hydraulic oil tube (for example, a hydraulic oil tube arranged in the fuselage).

FIG. 23 is a table diagram to explain on-off operations of a connection tube on-off valve when cleaning the Right hydraulic oil tube (for example, a hydraulic oil tube arranged in the right wing).

DESCRIPTION OF THE EMBODIMENTS

In the following detailed description, to provide a comprehensive understanding of embodiments, several detailed specific matters will be disclosed for explanatory purposes. However, it is obvious that the single or plural embodiment(s) can be performed without those detailed specific matters. With reference to the accompanying drawings, embodiments for performing a cleaning device will be explained below. The cleaning device and the cleaning method shown in the following is to clean, efficiently in a short time, inside a plurality of hydraulic oil tube arranged in an airframe of an aircraft, such as wings and fuselage; a part will be taken among several systems of hydraulic oil tube to start explaining thereof, for convenience of explanation.

(Embodiment of Cleaning Two Systems of Hydraulic Oil Tube Having a T-Junction 96)

First, with reference to FIG. 1 to FIG. 6, an embodiment of cleaning two systems of hydraulic oil tube (supply flow path and return flow path) provided with a first hydraulic oil tube (91, 91A) and a second hydraulic oil tube (92, 92A) will be explained. It should be noted that, for example, the first hydraulic oil tube is included in a first hydraulic system and the second hydraulic oil tube is included in a hydraulic system which is different from the first hydraulic system.

Figure 1:
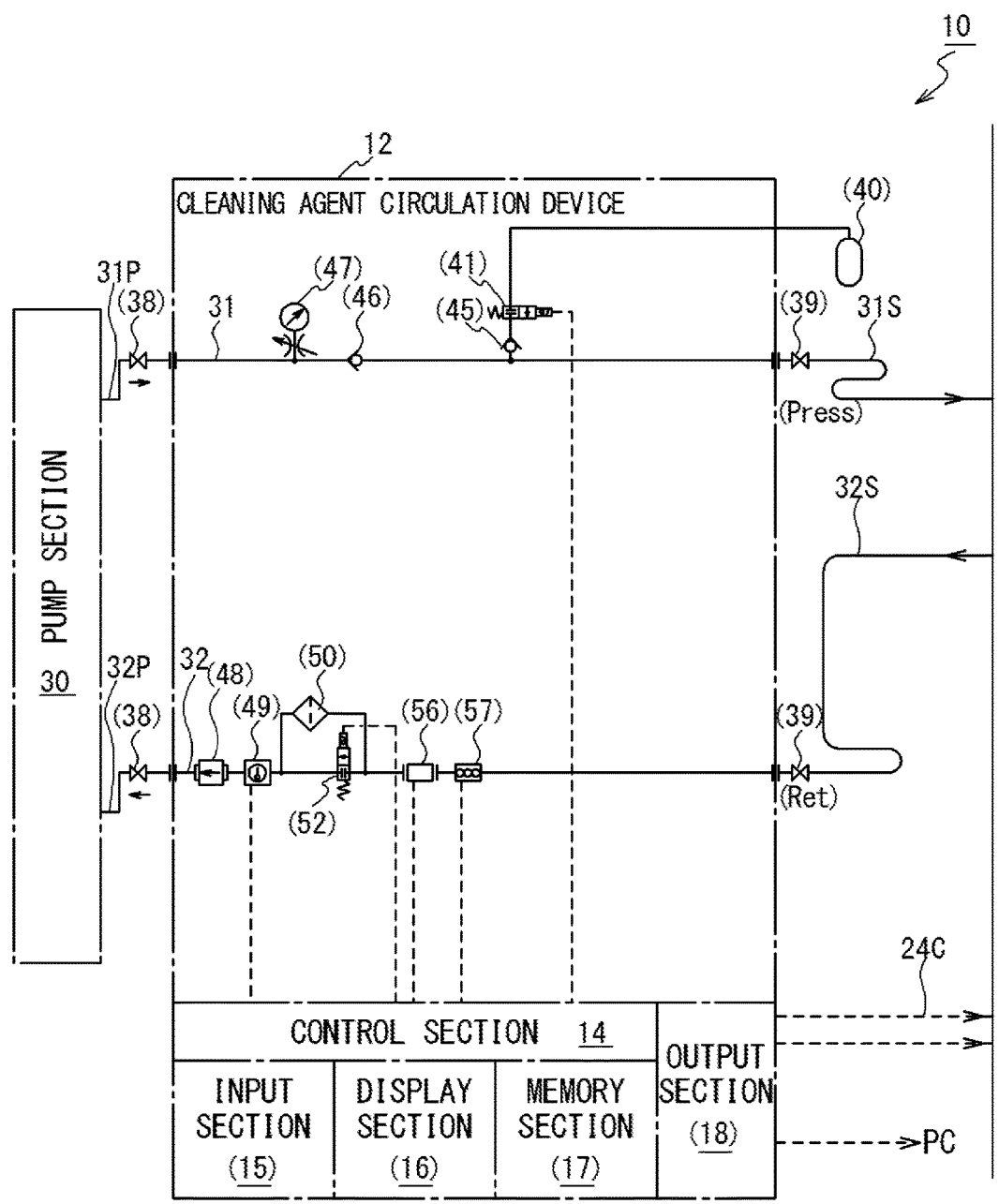
FIG. 1 is a drawing to briefly explain an example of a hydraulic circuit of a cleaning agent circulation device in a cleaning device.
Figure 2:
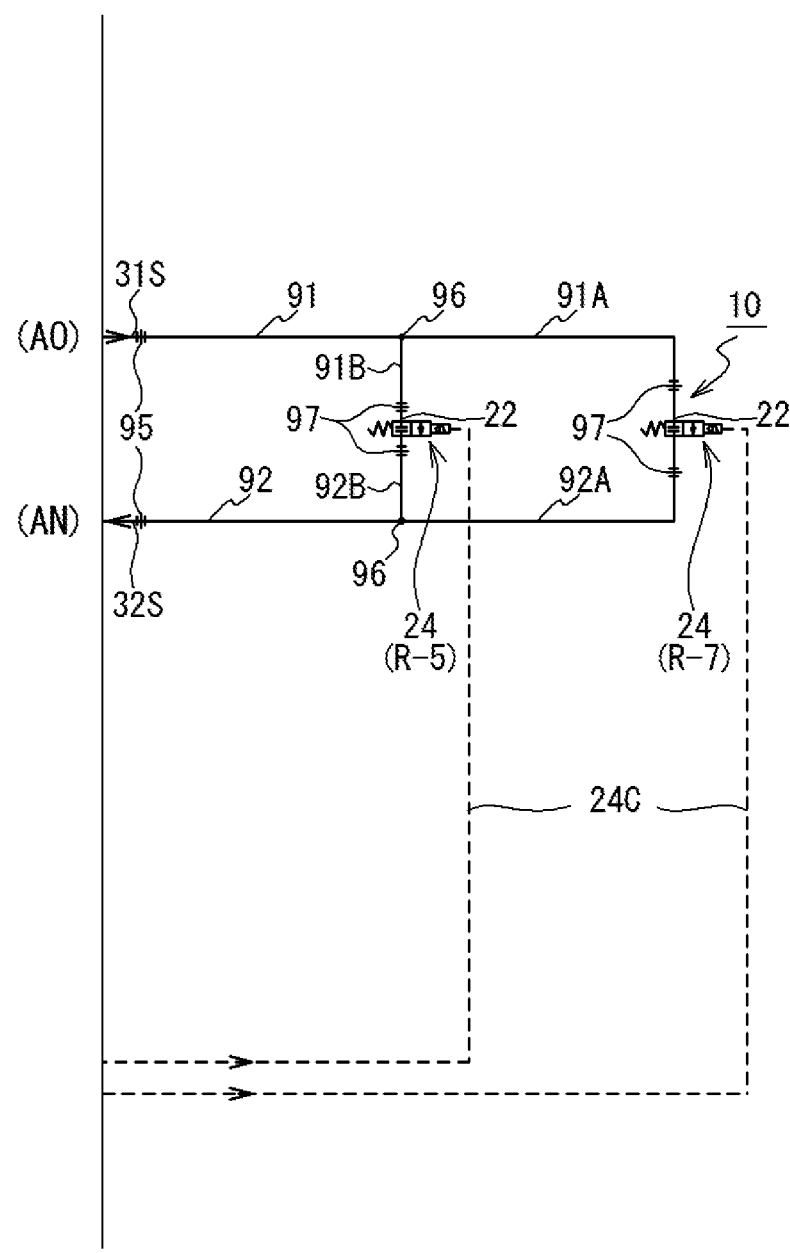
FIG. 2 is a drawing to briefly explain a connection of a hydraulic circuit of two systems of hydraulic oil tube at an aircraft to be cleaned, a valved connection tube and a connection tube on-off valve.
Figure 3:
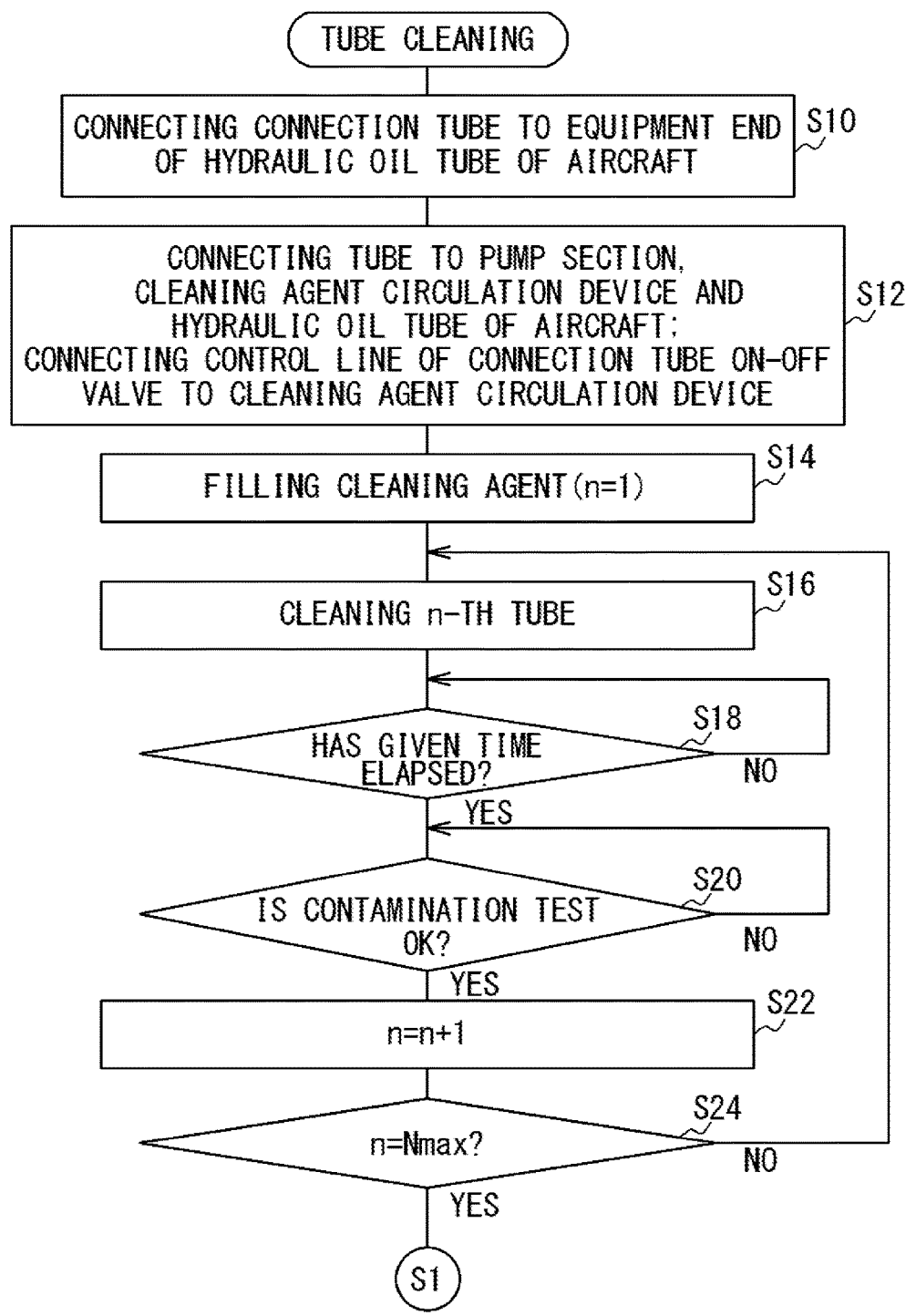
FIG. 3 is a first half of a flowchart to explain a method of tube cleaning by use of the cleaning device.
Figure 4:
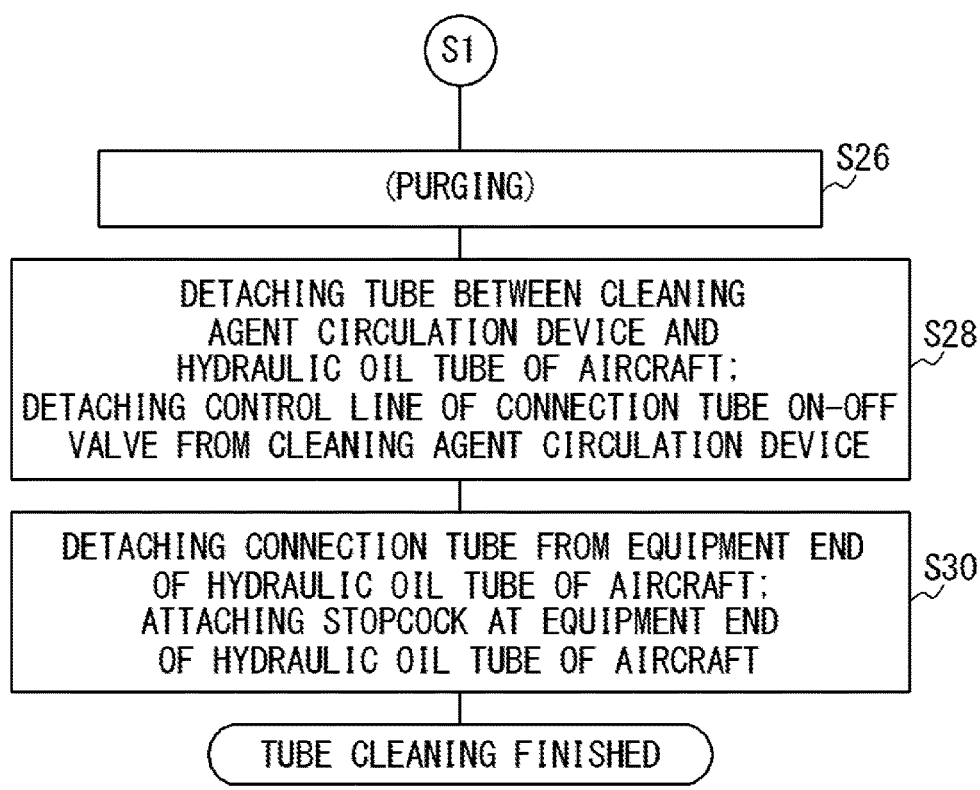
FIG. 4 is a second half of the flowchart to explain the method of tube cleaning by use of the cleaning device.

FIG. 1 is a drawing to briefly explain an example of a hydraulic circuit of a cleaning agent circulation device 12 in a cleaning device 10. FIG. 2 is a drawing to briefly explain an example of connection of: a hydraulic circuit of two systems of hydraulic oil tube provided with a first hydraulic oil tube (91, 91A) and a second hydraulic oil tube (92, 92A) at an aircraft to be cleaned; a cleaning agent circulation device 12 of the cleaning device 10; a valved connection tube 22; and a connection tube on-off valve 24. FIG. 3 and FIG. 4 are a flowchart to explain a method of tube cleaning by use of the cleaning device 10. FIG. 5 is a table diagram to explain on-off operation (Left) of the connection tube on-off valve 24.

In FIG. 1 are shown a pump section 30 and a cleaning agent circulation device 12 included in the cleaning device 10. The pump section 30 pumps a cleaning agent of a predetermined pressure and a predetermined flow rate via a supply flow path 31P. In addition, the pump section 30 collects the cleaning agent used for cleaning via a return flow path 32P. A phosphate ester type synthetic oil or the like can be used as the cleaning agent.

The cleaning agent circulation device 12 is provided with a supply flow path 31, a return flow path 32 and a control section 14. In addition, if necessary, the cleaning agent circulation device 12 can be further provided with an input section 15, a display section 16, a memory section 17, an output section 18, valves 38, valves 39, a purge agent 40, a purge valve 41, a purge check valve 45, a purge check valve 46, a pressure gauge 47, a flow sight tube 48, a thermometer 49, a filter 50, a filter valve 52, a flowmeter 56 and a sampler 57.

The supply flow path 31 is a flow path which connects the supply flow path 31P of the pump section 30 and the first hydraulic oil tube 91 of the aircraft to perform a supply of the cleaning agent to the first hydraulic oil tube 91.

The return flow path 32 is a flow path which connects the return flow path 32P of the pump section 30 and the second hydraulic oil tube 92 of the aircraft to return the cleaning agent from the second hydraulic oil tube 92.

The valves 38 are arranged in the supply flow path 31P, which is between the pump section 30 and the cleaning agent circulation device 12, and the return flow path 32P, which is between the pump section 30 and the cleaning agent circulation device 12, respectively. When detaching the supply flow path 31P and the return flow path 32P from the cleaning agent circulation device 12, the valves 38 are closed in advance. When connecting the pump section 30 and the cleaning agent circulation device 12 to perform cleaning of hydraulic oil tube, the valves 38 are opened in advance to realize a state in which cleaning agent can circulate. As the valves 38 can be used valves that opens and closes manually, solenoid valves, and the like.

The valves 39 are arranged in the supply flow path 31S, which is between the cleaning agent circulation device 12 and a hydraulic oil tube (for example, the first hydraulic oil tube 91), and the return flow path 32S, which is between the cleaning agent circulation device 12 and a hydraulic oil tube (for example, the second hydraulic oil tube 92), respectively. When detaching the supply flow path 31S and the return flow path 32S from the cleaning agent circulation device 12, the valves 39 are closed in advance. When connecting the cleaning agent circulation device 12 and a hydraulic oil tube to perform cleaning of the hydraulic oil tube, the valves 39 are opened in advance to realize a state in which the cleaning agent can circulate. As the valves 39 can be used valves that opens and closes manually, solenoid valves, and the like.

The purge agent 40 is a fluid which is pumped in a hydraulic oil tube in a step of removing the cleaning agent, after the cleaning of the hydraulic oil tube is finished. As the purge agent 40 can be used an inert gas such as a Nitrogen gas or the like.

The purge valve 41 is a valve which is used to supply the purge agent 40 to hydraulic oil tube via the supply flow path 31 and to block the supply. The purge valve 41 is usually closed and is opened in a purging step during which the cleaning agent is removed.

The purge check valve 45 is a check valve which prevents, when cleaning or the like, the cleaning agent to flow into a side of the purge valve 41 of the supply flow path 31.

The purge check valve 46 is a check valve which prevents, in the purging step or the like, the purge agent 40 to flow into a side of the pressure gauge 47 of the supply flow path 31 and the pump section 30.

The pressure gauge 47 is a device arranged in the supply flow path 31 to measure a supply pressure of the cleaning agent when cleaning.

The flow sight tube 48 is a gaze tube arranged in the return flow path 32 to inspect a flow of the cleaning agent.

The thermometer 49 is a device arranged in the return flow path 32 to measure a temperature of the cleaning agent.

The filter 50 is a device arranged in the return flow path 32 to collect, during cleaning step, dusts (contamination) existing in the hydraulic oil tube and prevent inflow into the pump section 30.

The filter valve 52 is arranged in the return flow path 32, parallel to the filter 50. The filter valve 52 is usually closed to let the cleaning agent, which has circulated inside the hydraulic oil tube, flow to the filter 50. During the purging step after the cleaning is finished, the filter valve 52 is opened to let the purge agent 40 flow to downstream side, without passing through the filter 50.

The flowmeter 56 is a device arranged in the return flow path 32 to measure a flow rate of the cleaning agent during cleaning.

The sampler 57 is a dust inspecting device arranged in the return flow path 32 to measure a quantity of dust (contamination) included in the cleaning agent returned while cleaning and for judging an end of cleaning, or, is a connector which connects the dust inspection device and the return flow path 32.

The control section 14 collects measured values from various measuring instruments, such as the pressure gauge 47, the thermometer 49, the flowmeter 56, the sampler 57 or the like, and performs transmission and reception of data between the input section 15, the display section 16, the memory section 17, the output section 18 or the like. In addition, the control section 14 perform control of the purge valve 41, the filter valve 52 and a connection tube on-off valve 24 which will be described below with reference to FIG. 2. The control section 14 can automatize cleaning of hydraulic oil tube by inputting data or instructions from each peripheral device and outputting data or instructions to each peripheral device, in an order programmed in advance.

The input section 15 includes a switch, a button, a keyboard or the like and is a device to which an operator inputs instructions such as a starting instruction of automatic cleaning, decision of various cleaning conditions, emergency stop or the like, and which outputs inputted instructions to the control section 14.

The display section 16 is provided with a display device such as a display panel, a display lamp or the like, and performs, on a basis of instructions from the control section 14, a display of measured values of various measuring instruments, a display of step during automating cleaning, a display of various statuses during automatic cleaning and other display.

The memory section 17 performs storage of measured values of various measuring instruments, storage of progress information of automatic cleaning and various statuses during automatic cleaning, storage of programs related to automatic measurements, and the like.

The output section 18 outputs to the connection tube on-off valve 24, on a basis of instructions of the control section 14, control commands such as opening, closing or the like. In addition, the output section 18 can perform to a computer PC connected to outside, on a basis of instructions of the control section 14, output of measured values of various measuring instruments, output of progress information during automatic cleaning and output of various statuses.

Next, an example of connection of the hydraulic circuit on the aircraft side and the cleaning device 10 will be explained with reference to FIG. 2.

With reference to FIG. 2, the first hydraulic oil tube 91, 91A and 91B and the second hydraulic oil tube 92, 92A and 92B are installed on the aircraft side (for example, in main wings). The valved connection tube 22 of the cleaning device 10 and the connection tube on-off valve 24 are connected to the equipment end 97 which communicates with the first hydraulic oil tube 91A, 91B and the second hydraulic oil tube 92A, 92B. It should be noted that the equipment end 97 is a connection end on the side of the equipment to which any equipment or element when using the aircraft.

A supply end 95 is formed at one end of the first hydraulic oil tube 91 (for example, of the main wings on a side connected to the fuselage). A T-junction 96 is formed in the middle of the first hydraulic oil tube 91 arranged inside the aircraft to branch to the first hydraulic oil tube 91A (first junction section) and the first hydraulic oil tube 91B (second junction section). Equipment ends (connection ends) 97 are respectively provided to ends of both the first hydraulic oil tube 91A and the first hydraulic oil tube 91B. The supply ends 95 are, for example, connection ends connected to the fuselage side of the aircraft. In addition, the equipment ends 97 are connection ends connected to an actuator side of a maneuvering device.

A supply end 95 is formed at one end of the second hydraulic oil tube 92 (for example, of the main wings on a side connected to the fuselage). A T-junction 96 is formed in the middle of the second hydraulic oil tube 92 arranged inside the aircraft to branch to the second hydraulic oil tube 92A (first junction section) and the second hydraulic oil tube 92B (second junction section). Equipment ends (connection ends) 97 are respectively provided to ends of both the second hydraulic oil tube 92A and the second hydraulic oil tube 92B. The equipment ends 97 are connection ends connected to an actuator side of a maneuvering device.

In the example disclosed in FIG. 2, a valved connection tube 22 is arranged between the first hydraulic oil tube 91A (first junction section) and the second hydraulic oil tube 92A (first junction section). And, the first hydraulic oil tube 91A and the second hydraulic oil tube 92A are fluidly connected via the valved connection tube 22. In addition, another valved connection tube 22 is arranged between the first hydraulic oil tube 91B (second junction section) and the second hydraulic oil tube 92B (second junction section). And, the first hydraulic oil tube 91B and the second hydraulic oil tube 92B are fluidly connected via the another valved connection tube 22.

(Method of Cleaning a Tube)

Next, a method of cleaning a hydraulic oil tube will be explained with reference to FIG. 3 and FIG. 4.

In a step S10 "CONNECTING CONNECTION TUBE TO EQUIPMENT END OF HYDRAULIC OIL TUBE OF AIRCRAFT", an operator connects the valved connection tube 22 between the equipment end 97 of the first hydraulic oil tube 91A and the equipment end 97 of the second hydraulic oil tube 92A. Similarly, the valved connection tube 22 is connected between the equipment end 97 of the first hydraulic oil tube 91B and the equipment end 97 of the second hydraulic oil tube 92B. A connection tube on-off valve 24, which controls pass and stop of the cleaning agent, is arranged in the valved connection tube 22.

Next, in a step S12 "CONNECTING TUBE TO PUMP SECTION, CLEANING AGENT CIRCULATION DEVICE AND HYDRAULIC OIL TUBE OF AIRCRAFT", the operator connects the supply flow path 31P (tube) of the pump section 30 shown in FIG. 1 to the supply flow path 31 of the cleaning agent circulation device 12, and the return flow path 32P (tube) to the return flow path 32 of the cleaning agent circulation device 12. And, the supply flow path 31S is connected to the supply flow path 31 of the cleaning agent circulation device 12, and the supply flow path 31S is connected to the supply end 95 (port AO) of the first hydraulic oil tube 91 of the aircraft shown in FIG. 2. Similarly, the return flow path 32S is connected to the return flow path 32 of the cleaning agent circulation device 12, and the return flow path 32S is connected to the supply end 95 (port AN) of the second hydraulic oil tube 92 of the aircraft shown in FIG. 2.

In the same step S12 "CONNECTING CONTROL LINE OF CONNECTION TUBE ON-OFF VALVE TO CLEANING AGENT CIRCULATION DEVICE", the operator connects a control line 24C, which transfers a control signal to the connection tube on-off valve 24, to an output section 18 of the cleaning agent circulation device 12 arranged far from each other. By connecting the cleaning agent circulation device 12 and the connection tube on-off valve 24 via the control line 24C in this way, operations of opening and closing the connection tube on-off valve 24 can be remote-controlled by use of the cleaning agent circulation device 12 arranged in a distant place.

Next, in a step S14 "FILL CLEANING AGENT", the pump section 30 is started to open the valve 38 and the valve 39 which were closed and to set in a state in which the cleaning agent can circulate. And, the operator operates the input section 15 or the like to instruct the control section 14 to start the tube cleaning.

In the next step S16 "CLEANING n-TH TUBE", the control section 14 outputs to the pump section 30 a control command of supplying a predetermined pressure and a predetermined flow rate. And, the control section 14 instructs, via the output section 18, opening and closing operations of the connection tube on-off valve 24. As a result, a time lapse time starts measuring time and the cleaning device 10 starts cleaning. The control section 14 acquires, if necessary, measured values of various measuring instruments such as the pressure gauge 47, the thermometer 49, the flowmeter 56, the sampler 57, and the like, to store in the memory section 17 at every predetermined period (for example, at a predetermined time intervals). The measured values can be displayed on the display section 16 and outputted to the computer PC connected to outside via the output section 18.

For example, in the first tube cleaning process (No. 1), as shown in FIG. 5, an instruction is outputted to close the connection tube on-off valve 24 (R-5) and open the connection tube on-off valve 24 (R-7). It should be noted that, in the cleaning condition shown in FIG. 5, the supply end 95 (port AO) of the first hydraulic oil tube 91 is connected to the supply flow path 31 (Press) and the supply end 95 (port AN) of the second hydraulic oil tube 92 is connected to the return flow path 32 (Ret).

In the first tube cleaning process shown in FIG. 5, are cleaned the first hydraulic oil tube 91, 91A and the second hydraulic oil tube 92, 92A, which are shown in FIG. 2. In addition, in the second tube cleaning process, are cleaned the first hydraulic oil tube 91, 91B and the second hydraulic oil tube 92, 92B, which are shown in FIG. 2. And, lastly in the third tube cleaning process, are cleaned all of the first hydraulic oil tube 91, 91A, 91B and the second hydraulic oil tube 92, 92A, 92B, which are shown in FIG. 2. It should be noted that, in a case where the sectional area of the hydraulic oil tube to be cleaned is bigger, the flow rate of the cleaning agent generally is set higher.

As cleaning conditions related to the supply of the cleaning agent, for example, oil temperature of the cleaning agent can be set to 100 degrees Fahrenheit, the minimum value of the flow rate can be set to 8.0 GPM (Gallon Per Minute), pressure of the cleaning agent can be set to 900 PSI (Pound-force per Square Inch), dust quantity (contamination level) can be set to less than a predetermined value (cleaner than CLASS 3), in the first tube cleaning process (No. 1) and the second tube cleaning process (No. 2). In addition, in the third tube cleaning process (No. 3), the minimal value of the flow rate of the cleaning agent can be increased to 10.0 GPM, since parallel portions exist in the tube.

In the next step S18 "HAS GIVEN TIME ELAPSED?", the control section 14 performs a process of waiting for a count value of the time elapse timer to pass over a predetermined waiting time T1 (for example, five minutes). In a case where the count value of the time elapse timer has passed over a predetermined time T1, the process to be performed by the control section 14 is forwarded to the next one.

In the next step S20 "IS CONTAMINATION TEST OK?", the control section 14 performs, if necessary, a process of waiting (verification time T2) for the quantity of dust (contamination level) included in the cleaning agent and measured by the sampler 57, to become lower than a predetermined value (for example, cleaner than CLASS 3). If the quantity of dust, which is measured by the sampler 57, is converged to a value lower than the predetermined value, then the process to be executed by the control section 14 is forwarded to the next step S22. It should be noted that the cleaning time of the hydraulic oil tube becomes the waiting time T1+the verification time T2 (T1+T2).

In the next step S22 "n=n+1", the control section 14 set the next cleaning conditions (for example, No. 2).

In the next step S24 "n=Nmax?", the control section 14 performs a judge whether the last cleaning process is finished or not. If the last cleaning process is not finished, then the process returns to the step S16 to execute a next cleaning process (for example, the second tube cleaning process shown in FIG. 5 as No. 2). If the last cleaning process is judged to be finished, then the process executed by the control section 14 is forwarded to the step S26 "PURGING" shown in FIG. 4.

In step S26, the control section 14 performs a purging if necessary. During the purging process, the control section 14 outputs a command to open the filter valve 52 shown in FIG. 1 and outputs an instruction to open the purge valve 41. And, along the cleaning processes shown in FIG. 5 for example (No. 1 to 3), a process of removing the cleaning agent in the first hydraulic oil tube 91, 91A, 91B and the second hydraulic oil tube 92, 92A, 92B, shown in FIG. 2, is performed. When the removal of the cleaning agent is finished in the step S26, then the process is forwarded to the step S28 "DETACHING TUBE BETWEEN CLEANING AGENT CIRCULATION DEVICE AND HYDRAULIC OIL TUBE OF AIRCRAFT; DETACHING CONTROL LINE OF CONNECTION TUBE ON-OFF VALVE FROM CLEANING AGENT CIRCULATION DEVICE".

In the step S28, the operator performs closing operations of the valves 39 and detaching the supply flow path 31S and the return flow path 32S from the supply ends 95 of the aircraft, respectively. And, an operation of detaching the control line 24C from the connection tube on-off valve 24 is performed.

In the next step S30 "DETACHING CONNECTION TUBE FROM EQUIPMENT END OF HYDRAULIC OIL TUBE OF AIRCRAFT; ATTACHING STOPCOCK AT EQUIPMENT END OF HYDRAULIC OIL TUBE OF AIRCRAFT", the operator detaches the valved connection tubes 22 which were connected to the equipment ends 97 of the first hydraulic oil tube 91A, 91B and the second hydraulic oil tube 92A, 92B. And, the operator performs operations of attaching stopcocks to equipment ends 97 and supply ends 95. When the operations of the step S30 are finished, the tube cleaning is finished.

As described above, by using the cleaning device 10, switching flow path of cleaning agent from the first hydraulic oil tube 91A to the first hydraulic oil tube 91B, and switching flow path of cleaning agent from the second hydraulic oil tube 92A to the second hydraulic oil tube 92B, can be automatically performed. Therefore, number of times to execute operations of connecting or detaching tube in steps S12, S28 and S30 shown in FIG. 3 and FIG. 4 can be reduced, to perform cleaning of hydraulic oil tube with a shorter time and less operators.

It should be noted that a solenoid valve can be used as the connection tube on-off valve 24 described above; a servo valve, which changes at every moment the flow rate of the cleaning agent flowing inside the valved connection tube 22 on a basis of the instruction of the control section 14, and a shock-less valve, can also be used. A water hammer, which occurs due to a sudden stop of the cleaning agent flowing inside the hydraulic oil tube, can be prevented by gradually changing the flow rate of the cleaning agent flowing inside the valved connection tube 22, by using the servo valve or the shock-less valve.

(Embodiment of Arranging a Bypass Flow Path 33 and a Bypass Valve 34 Between the Supply Flow Path 31 and the Return Flow Path 32 of the Cleaning Agent Circulation Device 12)

Next, with reference to FIG. 6 to FIG. 9, will be explained a configuration in which a bypass flow path 33 and a bypass valve 34 are arranged in the cleaning agent circulation device 12. By using the configuration shown in FIG. 6 to FIG. 9 and by opening or closing operations of the connection tube on-off valve 24 connected to the equipment end (connection end) 97 at end portion of the first hydraulic oil tube 91 and the second hydraulic oil tube 92, water hammer, which can occur in hydraulic oil tube, can be mitigated.

Figure 6:
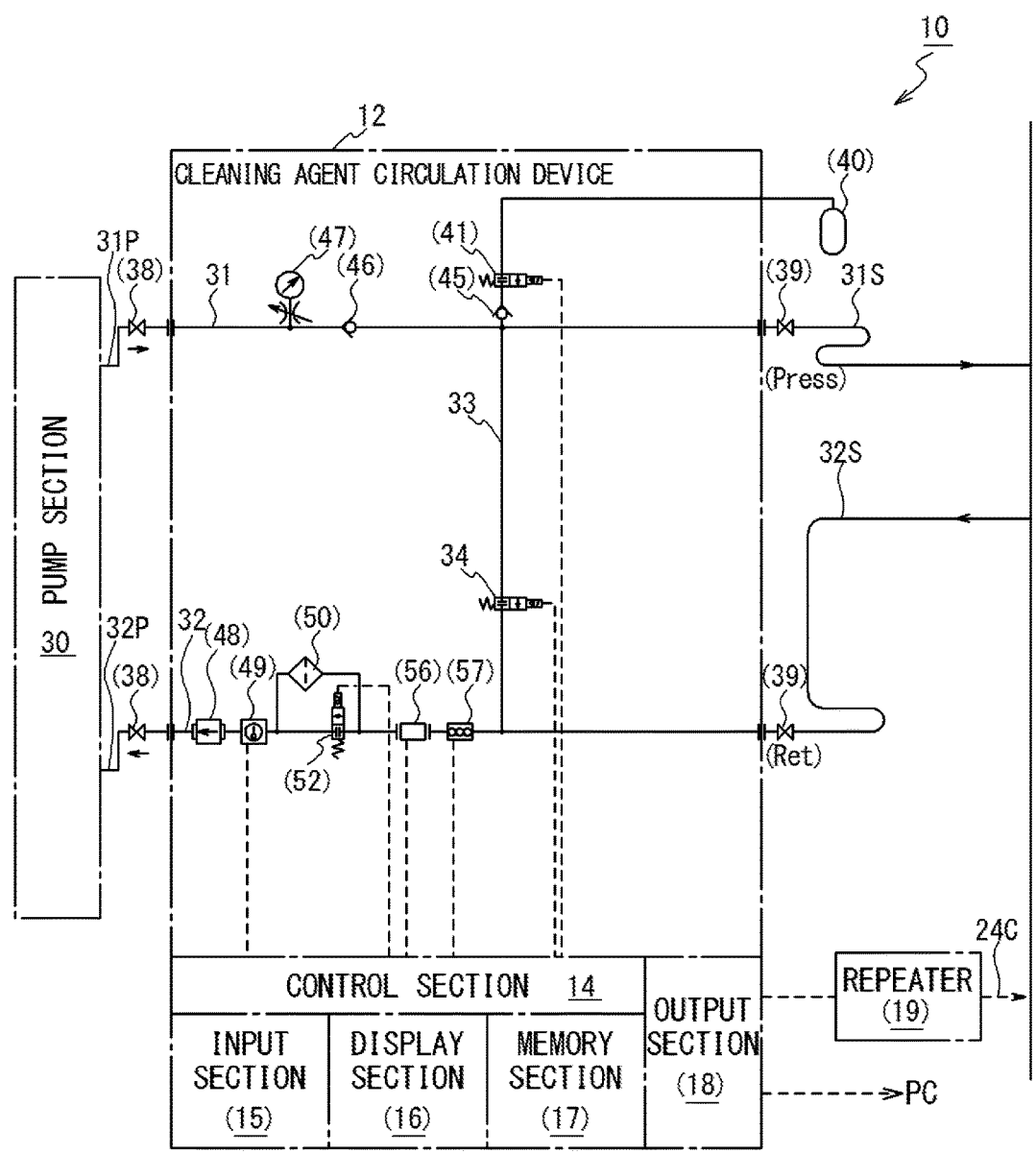
FIG. 6 is diagram to briefly explain an example of a hydraulic circuit in which a bypass flow path and a bypass valve are arranged in the cleaning agent circulation device in the cleaning device.
Figure 7:
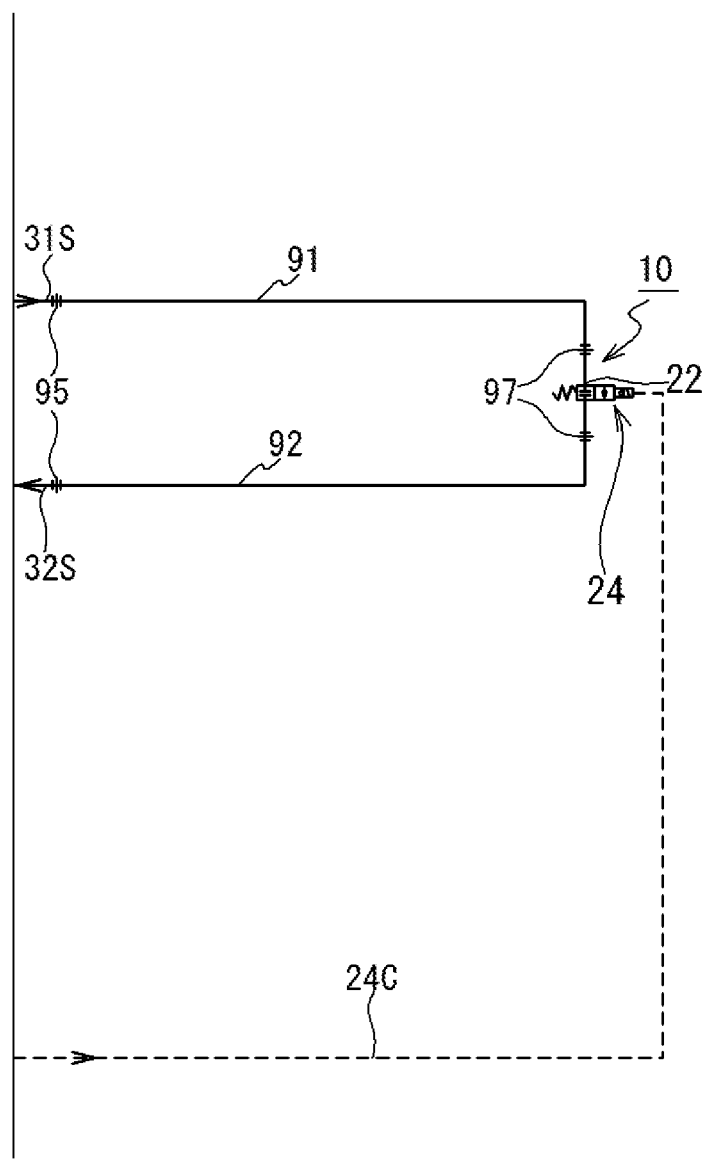
FIG. 7 is a drawing to briefly explain a connection of a hydraulic circuit of two systems of hydraulic oil tube at an aircraft to be cleaned, a valved connection tube and a connection tube on-off valve.
Figure 8:
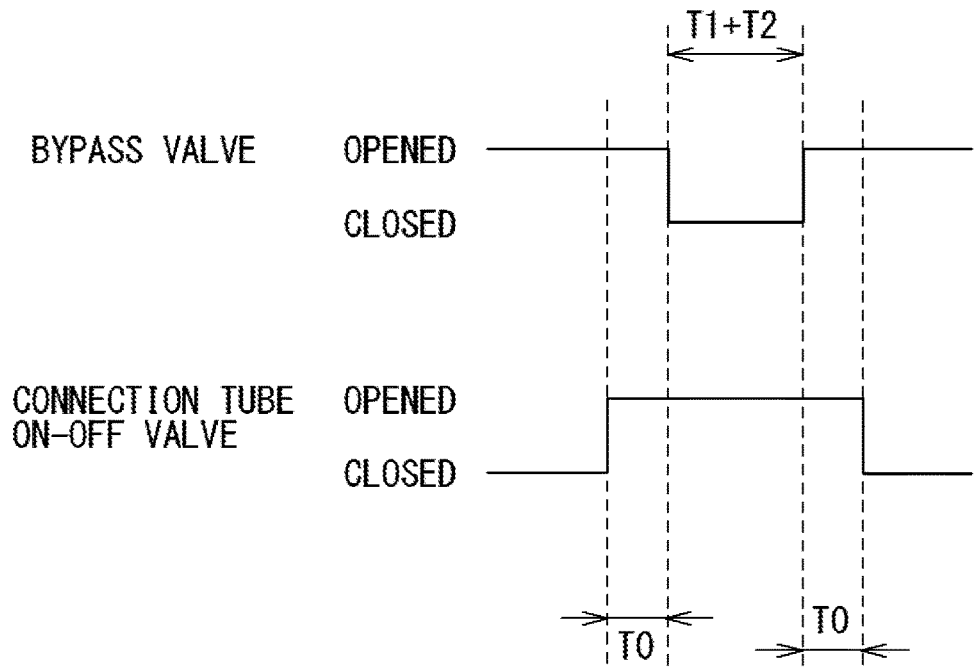
FIG. 8 is a timing chart to explain on-off timings of the bypass valve and the connection tube on-off valve during a cleaning process.
Figure 9:
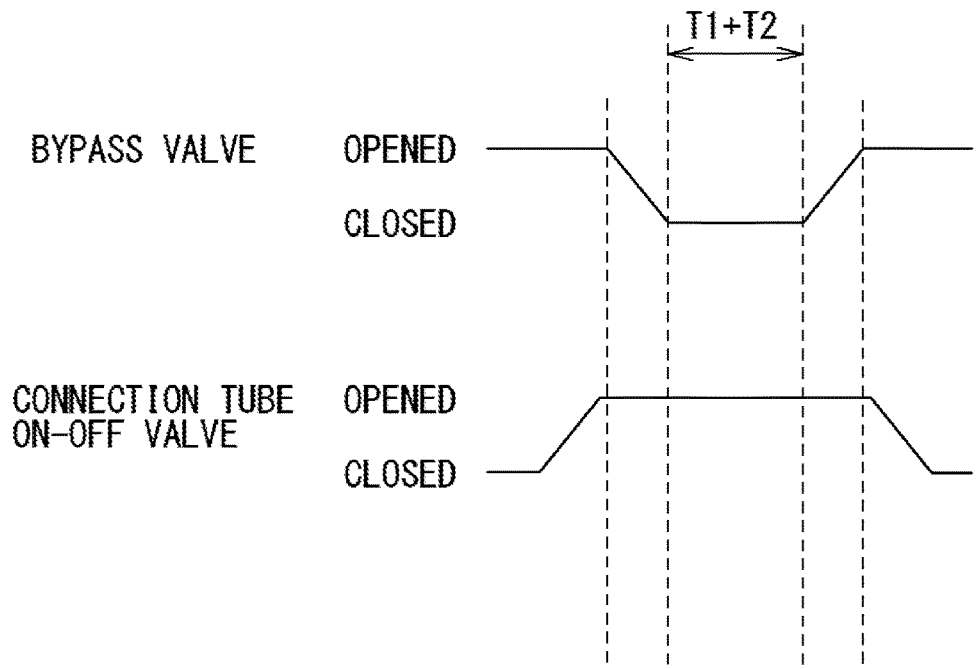
FIG. 9 is a timing chart to explain on-off operations of a servo type bypass valve and the connection tube on-off valve during the cleaning step.

FIG. 6 is a diagram to briefly explain an example of a hydraulic circuit in which a bypass flow path 33 and a bypass valve 34 are arranged in the cleaning agent circulation device 12 in the cleaning device 10. FIG. 7 is a drawing to briefly explain a connection of a hydraulic circuit of two systems of hydraulic oil tube provided with the first hydraulic oil tube 91 and the second hydraulic oil tube 92 in an aircraft to be cleaned, a cleaning agent circulation device 12 in a cleaning device 10, a valved connection tube 22 and a connection tube on-off valve 24. FIG. 8 is a timing chart to explain timings of opening and closing the bypass valve 34 and the connection tube on-off valve 24 during a cleaning process. FIG. 9 is a timing chart to explain opening and closing operations of the bypass valve 34 and the connection tube on-off valve 24, both of servo type, during the cleaning process. It should be noted that parts having function similar to the one of parts described in FIG. 1 and FIG. 2 are denoted by the same symbol and their explanation is omitted.

The bypass flow path 33 and the bypass valve 34 are arranged between the supply flow path 31 and the return flow path 32 of the cleaning agent circulation device 12 shown in FIG. 6. In addition, a repeater 19 is arranged between the output section 18 and connection tube on-off valve 24. A wiring of the control line 24C regarding the connection tube on-off valve 24 can be made easier, by arranging the repeater 19 as near as possible to the connection tube on-off valve 24.

Next, with reference to FIG. 7, an example of connection of the hydraulic circuit of the aircraft and the cleaning device 10 will be explained. On the side of the aircraft shown in FIG. 7, are installed the first hydraulic oil tube 91 and the second hydraulic oil tube 92. The valved connection tube 22 and the connection tube on-off valve 24 of the cleaning device 10 is connected to the equipment end (connection end) 97 which communicates with the first hydraulic oil tube 91 and the second hydraulic oil tube 92.

Next, the connection of the cleaning device 10 and each hydraulic oil tube will be explained. The supply flow path 31S is connected to the supply flow path 31 of the cleaning agent circulation device 12 shown in FIG. 6; and the supply flow path 31S is connected to the supply end 95 of the first hydraulic oil tube 91 of the aircraft shown in FIG. 7. Similarly, the return flow path 32S is connected to the return flow path 32 of the cleaning agent circulation device 12; and the return flow path 32S is connected to the supply end 95 of the second hydraulic oil tube 92 of the aircraft shown in FIG. 7. In addition, the control line 24C of the connection tube on-off valve 24 is connected to the repeater 19. The method of cleaning the hydraulic oil tube by use of the cleaning device 10 shown in FIG. 6 and FIG. 7 corresponds to the cleaning method shown in FIG. 3 and FIG. 4. Therefore, difference between the cleaning method shown in FIG. 3 and FIG. 4 will be explained in the following.

(Opening and Closing Control of Connection Tube On-Off Valve 24 and Bypass Valve 34)

Opening and closing control of connection tube on-off valve 24 and bypass valve 34 will be explained with reference to FIG. 8. In the method of cleaning hydraulic oil tube shown in FIG. 1 and FIG. 2, control of opening and closing of the connection tube on-off valve 24 is performed to switch cleaning of n-th tube cleaning process (with reference to process of step S1 shown in FIG. 3 and "No." column of n-th tube cleaning process shown in FIG. 5). On the other hand, in the cleaning device 10 shown in FIG. 6 and FIG. 7, both of the bypass valve 34 and the connection tube on-off valve 24 is controlled to switch cleaning of n-th tube cleaning process, by mitigating water hammer affecting hydraulic oil tube, as shown in FIG. 8.

With reference to FIG. 8, timings of opening and closing the bypass valve 34 and the connection tube on-off valve 24 during a period from before the time for cleaning the hydraulic oil tube (waiting time T1+verification time T2) to after the cleaning time, will be explained.

As shown in FIG. 8, in the state at a stage before performing cleaning of the hydraulic oil tube, the bypass valve 34 is opened and the connection tube on-off valve 24 is closed. In this case, the whole cleaning agent pumped by the pump section 30 flows from the supply flow path 31, through the bypass flow path 33, to the return flow path 32 and back to the pump section 30 again.

Next, in a process of the step S16 "CLEANING n-TH TUBE" shown in FIG. 3, to start the cleaning of the hydraulic oil tube, the control section 14 first sets the connection tube on-off valve 24, from a closed state to an opened state. At this time, most of the cleaning agent pumped from the pump section 30 flows from the supply flow path 31, through the bypass flow path 33, to the return flow path 32 and back to the pump section 30 again. In addition, a part of the cleaning agent pumped from the pump section 30 flows from the supply flow path 31, through the first hydraulic oil tube 91, the valved connection tube 22 and the second hydraulic oil tube 92, to the return flow path 32 and back to the pump section 30.

After that, after a predetermined waiting time T0, the bypass valve 34 is closed. Then, the cleaning agent pumped from the pump section 30 flows from the supply flow path 31, through the first hydraulic oil tube 91, the valved connection tube 22 and the second hydraulic oil tube 92, to the return flow path 32 and back to the pump section 30, to perform cleaning of the hydraulic oil tube (process of steps S16 to S20 shown in FIG. 3).

When the cleaning period of hydraulic oil tube (waiting time T1+verification time T2) has elapsed, the control section 14 outputs an instruction to open the bypass valve 34. At this time, most of the cleaning agent pumped from the pump section 30 flows from the supply flow path 31, through the bypass flow path 33 and to the return flow path 32. After that, after a predetermined waiting time T0, the connection tube on-off valve 24 is closed.

As described above, by closing the bypass valve 34, which was opened in advance, after opening the connection tube on-off valve 24 to start cleaning of the hydraulic oil tube, an abrupt change of pressure of the cleaning agent in the hydraulic oil tube can be reduced and a water hammer can be reduced. In addition, by opening the closed bypass valve 34 after the cleaning time of hydraulic oil tube (T1+T2) and before closing the connection tube on-off valve 24, an abrupt change of flow rate of the cleaning agent can be mitigated and the water hammer can be reduced.

Next, with reference to FIG. 9, opening and closing operations of the bypass valve 34 and the connection tube on-off valve 24, in a case where a servo valve or a shock-less valve is used as the bypass valve 34 and the connection tube on-off valve 24, will be explained. Also in the case of using a servo valve or a shock-less valve is used as the bypass valve 34 and the connection tube on-off valve, the bypass valve 34 is opened and the connection tube on-off valve 24 is closed at a stage before performing cleaning of hydraulic oil tube.

Next, in the process of the step S16 "CLEANING n-TH TUBE" shown in FIG. 3, when starting the cleaning of the hydraulic oil tube, the control section 14 gradually opens the connection tube on-off valve 24 from its closed state. After that, the control section 14 gradually closes the bypass valve 34 and flows the cleaning agent pumped by the pump section 30 from the supply flow path 31, through the first hydraulic oil tube 91, the valved connection tube 22 and the second hydraulic oil tube 92 and to the return flow path 32, to perform the cleaning of the hydraulic oil tube (processes of steps S16 to S20 shown in FIG. 3).

When hydraulic oil tube cleaning time (waiting time T1+verification time T2) has elapsed, the control section 14 outputs the instruction to gradually open the bypass valve 34. At that time, the flow of the cleaning agent pumped by the pump section 30 is gradually switched from the hydraulic oil tube to the bypass flow path 33. After that, the connection tube on-off valve 24 is gradually closed to gradually switch the flow of the cleaning agent pumped by the pump section 30 from the hydraulic oil tube to the bypass flow path 33.

As described above, by gradually performing opening and closing operations of the bypass valve 34 and the connection tube on-off valve 24, the flow of the cleaning agent from the hydraulic oil tube to the bypass flow path 33 and the flow of the cleaning agent from the bypass flow path 33 to the hydraulic oil tube can be gradually changed. And, by reducing abrupt change of pressure in the hydraulic oil tube, water hammer can be reduced. In addition, it is possible to perform a change of the flow paths within a short time while preventing water hammer.

(Embodiment of Arranging a Bypass Flow Path 33 and a Bypass Valve 34 Between a Supply Flow Path 31 and a Return Flow Path 32 of a Cleaning Agent Circulation Device 12 and Controlling a Plurality of Connection Tube On-Off Valves 24)

Next, with reference to FIG. 6, FIG. 10 and FIG. 11, an embodiment of arranging a bypass flow path 33 and a bypass valve 34 in the cleaning agent circulation device 12 and automatically cleaning the first hydraulic oil tube 91A, 91B, 91C and the second hydraulic oil tube 92A, 92B, 92C will be explained. Water hammer occurring in the hydraulic oil tube after cleaning can be mitigated in the embodiment shown in FIG. 6, FIG. 10 and FIG. 11, too.

FIG. 6 is a diagram to briefly explain an example of a hydraulic circuit in which are arranged a bypass flow path 33 and a bypass valve 34 in the cleaning agent circulation device 12 of the cleaning device 10. FIG. 10 is a diagram to briefly explain a connection of a hydraulic circuit of two systems of hydraulic oil tube provided with a first hydraulic oil tube 91, 91A, 91B, 91C and a second hydraulic oil tube 92, 92A, 92B, 92C on the side of the aircraft to be cleaned, a cleaning agent circulation device 12 of the cleaning device 10, a valved connection tube 22 and a connection tube on-off valve 24. FIG. 11 is a table diagram to explain opening and closing operations of the connection tube on-off valve 24. It should be noted that parts having function similar to the one of parts described in FIG. 1, FIG. 2, FIG. 5 to FIG. 8 are denoted by the same symbol and their explanation is omitted.

Figure 10:
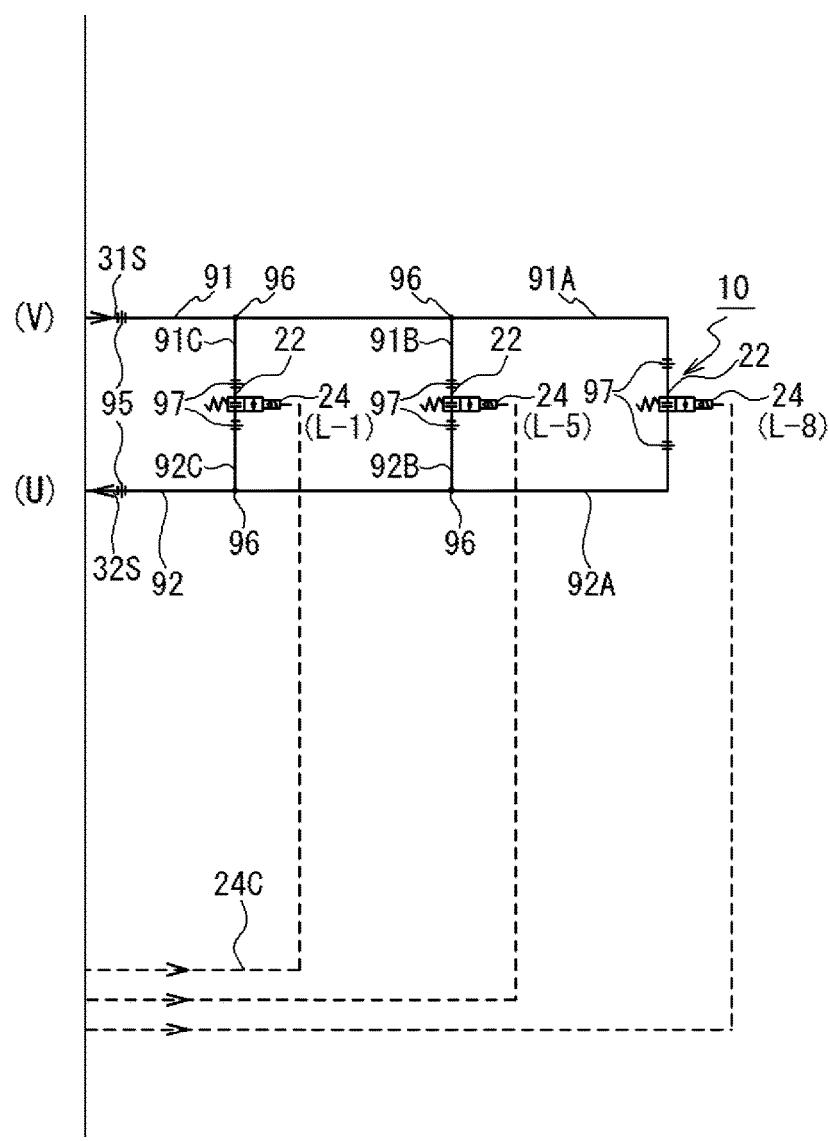
FIG. 10 is a diagram to briefly explain an example of connection of a hydraulic circuit of two systems of hydraulic oil tube at an aircraft to be cleaned, a valved connection tube and a connection tube on-off valve.

With reference to FIG. 10, an example of connection of the hydraulic oil tube of an aircraft and the cleaning device 10. On the side of the aircraft shown in FIG. 10, are installed a first hydraulic oil tube 91, 91A, 91B, 91C with T-junction 96 and a second hydraulic oil tube 92, 92A, 92B, 92C with T-junction 96. A valved connection tube 22 and a connection tube on-off valve 24 of the cleaning device 10 are connected to equipment ends (connection ends) 97 which communicate with the first hydraulic oil tube 91A, 91B, 91C and the second hydraulic oil tube 92A, 92B, 92C.

Next, the connection of the cleaning device 10 and each hydraulic oil tube will be explained. The supply flow path 31S is connected to the supply flow path 31 of the cleaning agent circulation device 12 shown in FIG. 6; and the supply flow path 31S is connected to the supply end 95 (port V) of the first hydraulic oil tube 91 of the aircraft shown in FIG. 10. Similarly, the return flow path 32S is connected to the return flow path 32 of the cleaning agent circulation device 12; and the return flow path 32S is connected to the supply end 95 (port U) of the second hydraulic oil tube 92 of the aircraft shown in FIG. 10. In addition, the control line 24C of the connection tube on-off valve 24 is connected to the repeater 19. It should be noted that the method of cleaning the hydraulic oil tube by use of the cleaning device 10 shown in FIG. 6 and FIG. 10 corresponds to the cleaning method shown in FIG. 1 to FIG. 5. Therefore, differences from the cleaning method shown in FIG. 1 to FIG. 5 will be explained below.

(Explanation of Opening and Closing Operations of the Connection Tube On-Off Valve 24 and Cleaning Conditions)

With reference to FIG. 11, an example of the method of cleaning the hydraulic oil tube shown in FIG. 10 will be explained. Also in a case of cleaning the first hydraulic oil tube 91A, 91B, 91C and the second hydraulic oil tube 92A, 92B, 92C, with junction as shown in FIG. 10, the cleaning can be finished within a short time with few switching operations, with the control section 14 performing opening and closing operations of connection tube on-off valve 24 shown in FIG. 11.

In the embodiment shown in FIG. 11, at the first process of cleaning tube (No. 1), the first hydraulic oil tube 91, 91A and the second hydraulic oil tube 92, 92A are cleaned. At the next second process of cleaning tube (No. 2), the first hydraulic oil tube 91, 91B and the second hydraulic oil tube 92, 92B are cleaned. At the next third process of cleaning hydraulic oil tube (No. 3), the first hydraulic oil tube 91, 91C and the second hydraulic oil tube 92, 92C are cleaned. At the last fourth process of cleaning tube (No. 4), the first hydraulic oil tube 91, 91A, 91B and the second hydraulic oil tube 92, 92A, 92B are cleaned again.

As cleaning conditions related to a supply of cleaning agent, for example, at the process of cleaning the first tube (No. 1) and the process of cleaning the second tube (No. 2), the oil temperature of the cleaning agent can be set to 100 degrees Fahrenheit, the minimal value of flow rate can be set to 8.0 GMP, the maximal pressure of the cleaning agent can be set to 900 PSI and the dust quantity (contamination level) can be set less than a predetermined value (cleaner than CLASS 3). In addition, at the process of cleaning the third tube (No. 3), the minimal value of flow rate of the cleaning agent can be increased to 10.0 GPM, because the sectional area of the hydraulic oil tube to be cleaned is greater. In addition, at the process of cleaning the fourth tube (No. 4), the minimal value of flow rate of the cleaning agent can be increased to 10.0 GPM, because parallel parts exist in the tube.

In the above explanation, an embodiment of automatically clean a hydraulic oil tube of an aircraft shown in FIG. 10 by use of the cleaning agent circulation device 12 shown in FIG. 6; however, the automatic cleaning can be performed by use of the cleaning agent circulation device 12 shown in FIG. 1, too.

(Embodiment of Cleaning Four Systems of Hydraulic Oil Tube)

Figure 12:
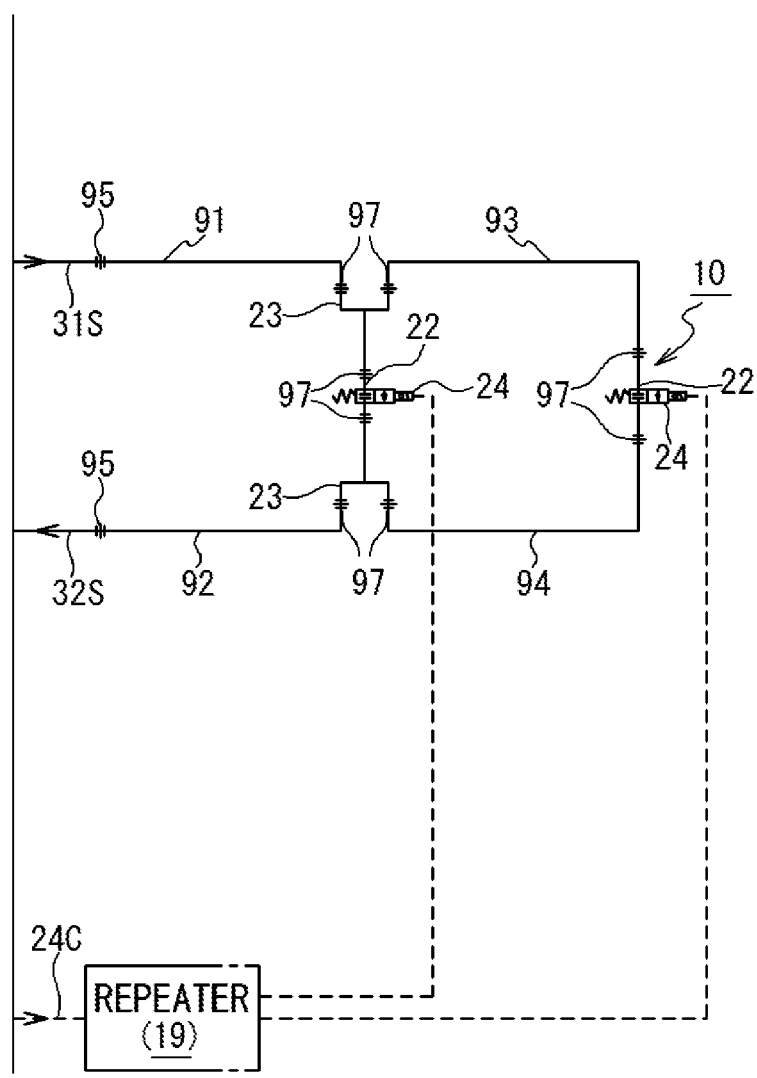
FIG. 12 is a diagram to briefly explain an example of connection of a hydraulic circuit of four systems of hydraulic oil tube at an aircraft to be cleaned, a valved connection tube, a junction connection tube and a connection tube on-off valve.

Next, with reference to FIG. 1 and FIG. 12, an embodiment of cleaning four systems of hydraulic oil tube will be explained. FIG. 12 is a drawing to briefly explain an example of connecting a hydraulic circuit of four systems of hydraulic oil tube on the side of the aircraft to be cleaned, a cleaning agent circulation device 12 of a cleaning device 10, valved connection tubes 22, junction connection tubes 23 and connection tube on-off valves 24.

The hydraulic oil tube of the aircraft shown in FIG. 2 is a hydraulic oil tube with two systems, which are the first hydraulic oil tube 91, 91A and the second hydraulic oil tube 92, 92A, and which are branched via the T-junctions 96. The hydraulic oil tube of the aircraft shown in FIG. 12 is an embodiment to clean four systems of hydraulic oil tube (first hydraulic oil tube 91, second hydraulic oil tube 92, third hydraulic oil tube 93 and fourth hydraulic oil tube 94) which have no T-junction 96 and which are independent.

To automatically clean the hydraulic oil tube shown in FIG. 12 by use of the cleaning agent circulation device 12 shown in FIG. 1, the equipment end (connection end) 97 communicating to the first hydraulic oil tube 91 and the equipment end (connection end) 97 communicating to the third hydraulic oil tube 93 are connected via a junction connection tube 23. Similarly, the equipment end (connection end) 97 communicating to the second hydraulic oil tube 92 and the equipment end (connection end) 97 communicating to the fourth hydraulic oil tube 94 are connected via a junction connection tube 23.

In addition, the equipment ends (connection ends) 97 of two junction connection tubes 23 are connected to each other via a valved connection tube 22. In addition, the equipment end (connection end) 97 of the third hydraulic oil tube 93 and the equipment end (connection end) 97 of the fourth hydraulic oil tube 94 are connected by use of the valved connection tube 22. By connecting each hydraulic oil tube, the junction connection tubes 23, the valved connection tube 22 and the connection tube on-off valve 24 as above, a hydraulic circuit similar to the hydraulic circuit of the hydraulic oil tube shown in FIG. 2 can be realized. The opening and closing operations of the connection tube on-off valve 24 shown in FIG. 12 are same as the opening and closing operations explained in FIG. 2 to FIG. 5 and therefore their explanation is omitted.

(Embodiment of Cleaning a Hydraulic Oil Tube Having an Odd Number of Supply Ends)

Next, with reference to FIG. 13 to FIG. 16, an embodiment of cleaning a hydraulic oil tube having an odd number of supply ends will be explained.

Figure 13:
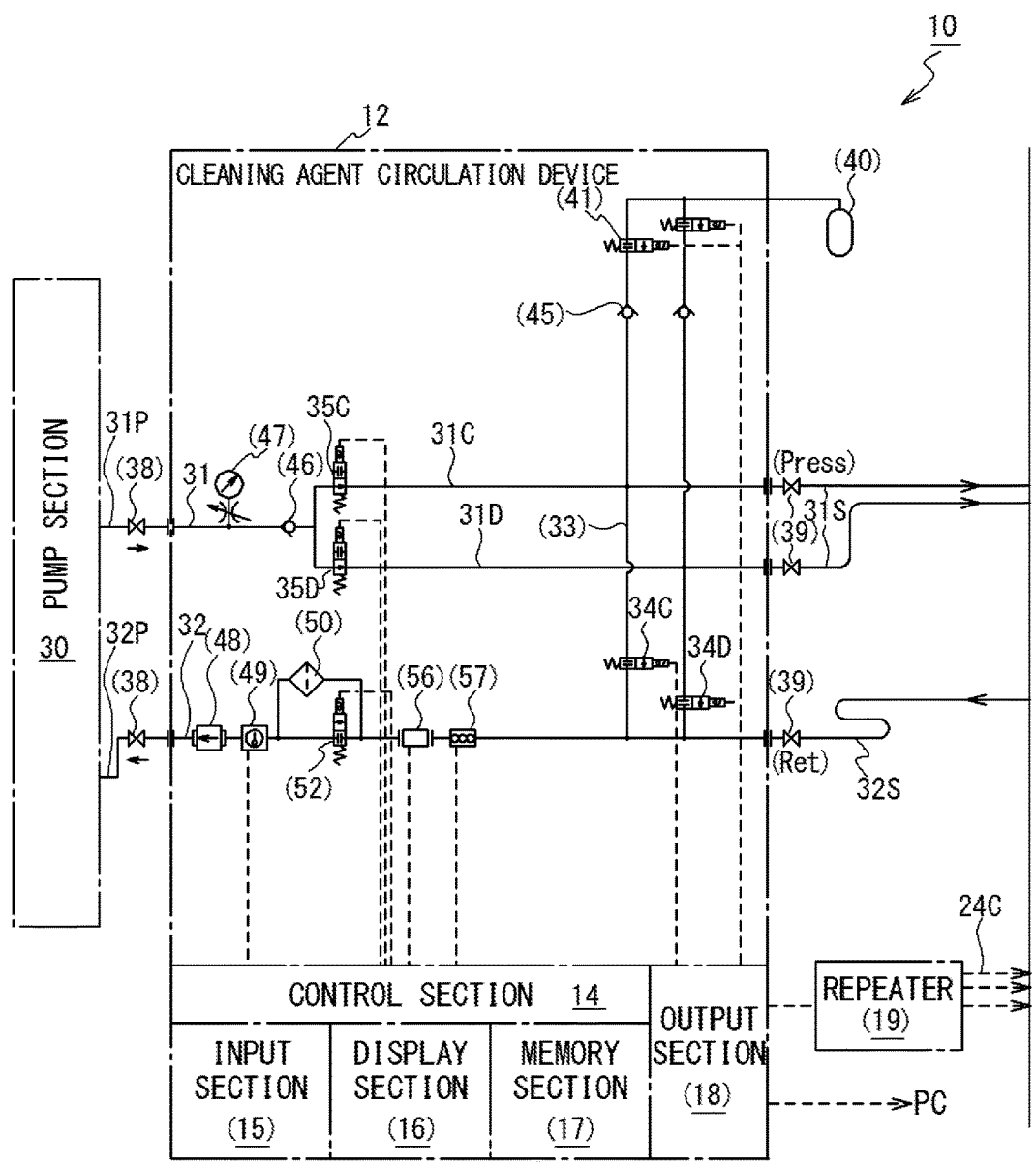
FIG. 13 is a diagram to explain a cleaning agent circulation device having two systems of supply flow path and one system of return flow path.
Figure 14:
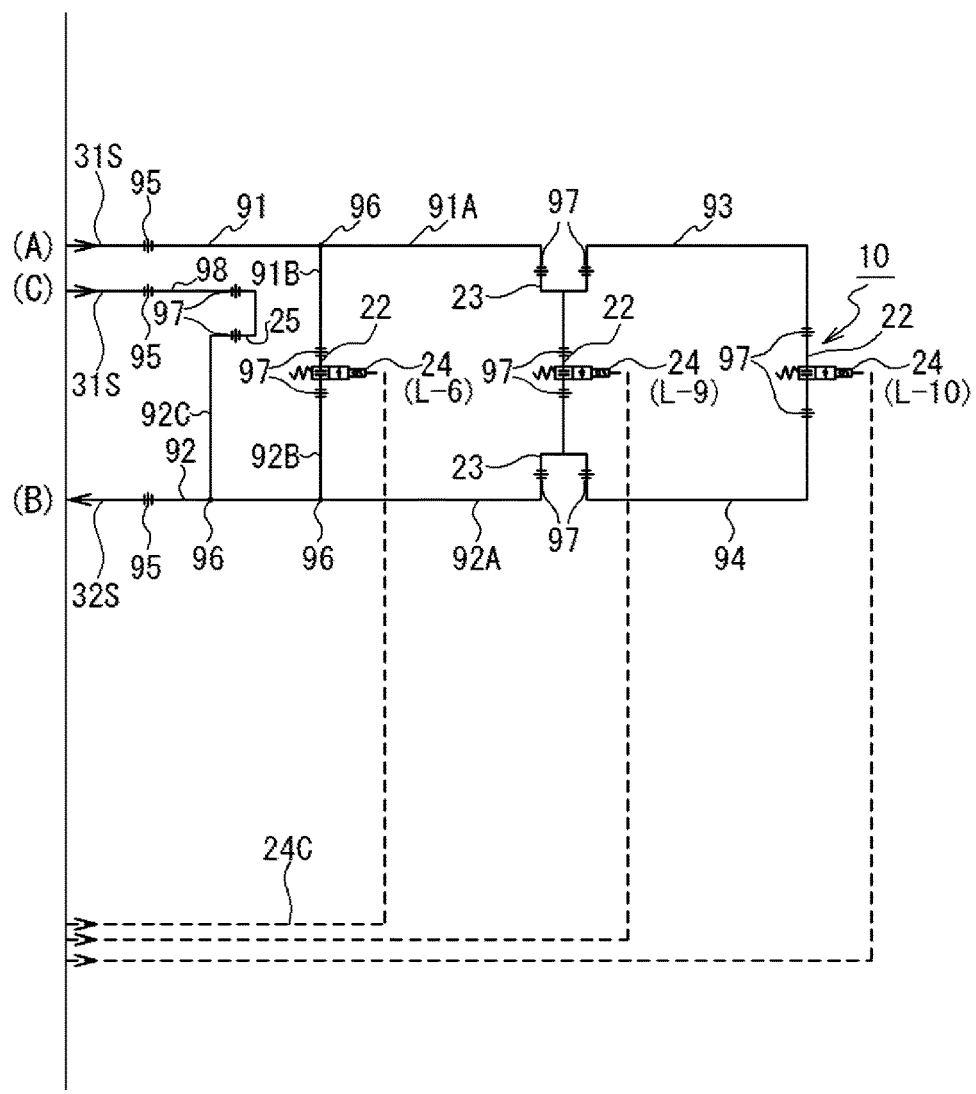
FIG. 14 is a diagram to briefly explain an example of connection of a hydraulic circuit of five systems of hydraulic oil tube at an aircraft to be cleaned, a valved connection tube, a junction connection tube and a connection tube on-off valve.
Figure 16:
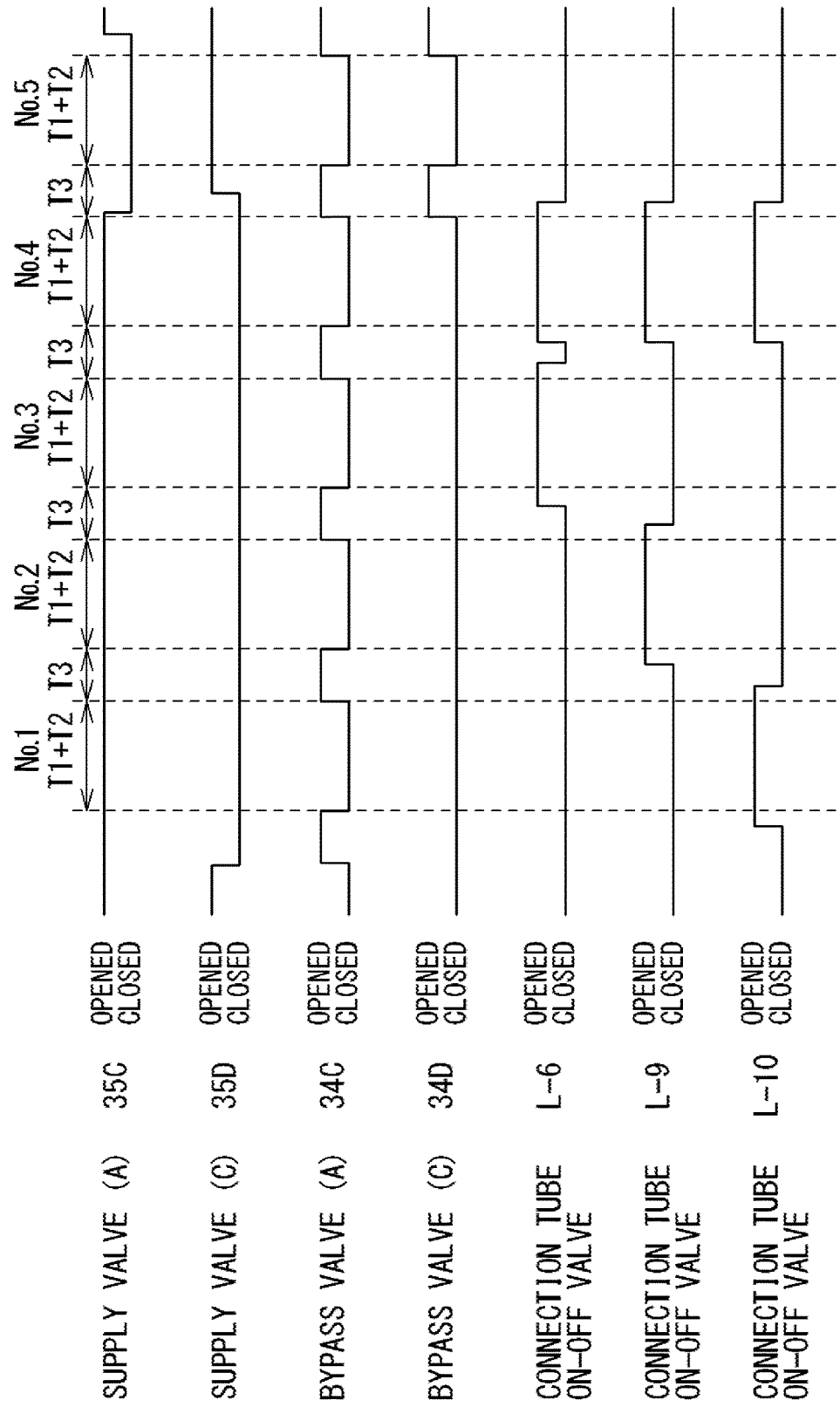
FIG. 16 is a timing chart when controlling the supply valve, the bypass valve and the connection tube on-off valve 24 on a basis of the on-off operations shown in FIG. 15.

FIG. 13 is a diagram to explain a cleaning agent circulation device 12 having two systems of supply flow path 31 and one system of return flow path 32. FIG. 14 is a diagram to briefly explain an example of connecting a hydraulic circuit of five systems of hydraulic oil tube having an odd number of supply ends to be cleaned, a cleaning agent circulation device 12 of a cleaning device 10, valved connection tubes 22, junction connection tubes 23 and connection tube on-off valves 24. FIG. 15 is a table diagram to explain opening and closing operations of the connection tube on-off valves 24 to clean the hydraulic oil tube having an odd number of supply ends. FIG. 16 is a timing chart of controlling the supply valves 35C, 35D, bypass valves 34C, 34D shown in FIG. 13 and the connection tube on-off valves 24 (L-6, L-9, L-10) shown in FIG. 14 on a basis of the opening and closing operations shown in FIG. 15. It should be noted that parts having function similar to the one of parts described in FIG. 1, FIG. 2 and FIG. 5 to FIG. 12 are denoted by the same symbol and their explanation is omitted.

First, with reference to FIG. 13, a configuration of a cleaning agent circulation device 12 having two systems of supply flow paths 31 and one system of return flow path 32 will be explained.

The supply flow path 31 of the cleaning agent circulation device 12 shown in FIG. 13 is branched to two supply flow paths 31C and 31D. The supply valve 35C, which controls supply and block of cleaning agent, is arranged to the supply flow path 31C, while the supply valve 35D, which controls supply and block of cleaning agent, is arranged to the supply flow path 31D, to enable switching of supply flow path of cleaning agent. In addition, to two supply flow paths 31C and 31D can be respectively connected purges valves 41, which supply purge agent 40, and purge check valves 45, 46. In addition, bypass flow paths 33 and bypass valves 34C, 34D between two supply flow paths 31C, 31D and return flow path 32.

Next, with reference to FIG. 14, will be explained an example of connecting a hydraulic circuit of five systems of hydraulic oil tube having an odd number of supply ends 95, a cleaning agent circulation device 12 of a cleaning device 10, valved connection tubes 22, junction connection tubes 23 and connection tube on-off valves 24.

The hydraulic oil tube shown in FIG. 14 has a first hydraulic oil tube 91, 91A, 91B having one T-junction 96, a second hydraulic oil tube 92, 92A, 92B, 92C having two T-junctions 96, a third hydraulic oil tube 93, a fourth hydraulic oil tube 94 and a fifth hydraulic oil tube 98.

In a case of performing an automatic cleaning of the hydraulic oil tube shown in FIG. 14 by use of the cleaning agent circulation device 12 shown in FIG. 13, the equipment end (connection end) 97 communicating to the first hydraulic oil tube 91A and the equipment end (connection end) 97 communicating to the third hydraulic oil tube 93 are connected by use of the junction connection tube 23, as shown in FIG. 14. In addition, the equipment end (connection end) 97 communicating to the second hydraulic oil tube 92A and the equipment end (connection end) 97 communicating to the fourth hydraulic oil tube 94 are connected by use of the junction connection tube 23. In addition, the equipment ends (connection ends) 97 of two junction connection tubes 23 are connected to each other by use of the valved connection tube 22, and the equipment end (connection end) 97 communicating to the third hydraulic oil tube 93 and the equipment end (connection end) 97 communicating to the fourth hydraulic oil tube 94 are connected by use of the valved connection tube 22.

And, another equipment end (connection end) 97 of the fifth hydraulic oil tube 98 and the equipment end (connection end) 97 of the second hydraulic oil tube 92C are connected by use of a connection tube 25.

Next, a connection between the cleaning agent circulation device 12 shown in FIG. 13 and the supply end 95 of the hydraulic oil tube shown in FIG. 14 will be explained.

The supply flow path 31S (port A) of the cleaning agent shown in FIG. 13 is connected to the supply end 95 (port A) of the first hydraulic oil tube 91 of the aircraft shown in FIG. 14. The return flow path 32S (port B) of the cleaning agent shown in FIG. 13 is connected to the supply end 95 (port B) of the second hydraulic oil tube 92 of the aircraft shown in FIG. 14. In addition, the supply flow path 31S (port C) of the cleaning agent shown in FIG. 13 is connected to the supply end 95 (port C) of the fifth hydraulic oil tube 98 of the aircraft shown in FIG. 14.

Next, with reference to FIG. 15 and FIG. 16, opening and closing operations of the connection tube on-off valves 24 when cleaning the hydraulic oil tube shown in FIG. 14. It should be noted that, as shown in FIG. 16, the supply valve 35C of the cleaning agent circulation device 12 shown in FIG. 13 is opened and the supply valve 35D is closed, from the first process of tube cleaning (No. 1) to the fourth process of tube cleaning (No. 4).

In the embodiment shown in FIG. 15 and FIG. 16, at the first process of tube cleaning (No. 1), the cleaning agent is supplied from the port A of the supply flow path 31S to clean the first hydraulic oil tube 91, 91A, the third hydraulic oil tube 93, the fourth hydraulic oil tube 94 and the second hydraulic oil tube 92, 92A, and the cleaning agent is back to the cleaning agent circulation device 12 via the port B of the return flow path 32S, to perform cleaning during a predetermined cleaning time (T1+T2). Next, the bypass valve 34C is opened during a switching time T3 and the next process is preceded.

In the next second process of tube cleaning (No. 2), the first hydraulic oil tube 91, 91A and the second hydraulic oil tube 92, 92A are cleaned. In the next third process of tube cleaning (No. 3), the first hydraulic oil tube 91, 91B and the second hydraulic oil tube 92, 92B are cleaned. In the next fourth process of tube cleaning (No. 4), the first hydraulic oil tube 91, 91A, 91B, the second hydraulic oil tube 92, 92A, 92B, the third hydraulic oil tube 93 and the fourth hydraulic oil tube 94 are cleaned.

At the last fifth process of tube cleaning (No. 5), firstly, the supply valve 35C of the cleaning agent circulation device 12 shown in FIG. 13 is closed and the supply valve 35D is opened. And, the cleaning agent is supplied from the port C of the supply flow path 31S to clean the fifth hydraulic oil tube 98 and the second hydraulic oil tube 92, 92C, and the cleaning agent is returned to the cleaning agent circulation device 12 via the port B of the return flow path 32S.

As explained above, the hydraulic oil tube of the aircraft shown in FIG. 14 can be automatically cleaned by use of the cleaning agent circulation device 12 shown in FIG. 13. It should be noted that the supply valves 35C, 35D of the cleaning agent circulation device 12 shown in FIG. 13 can be arranged to the supply flow path 31 of the cleaning agent circulation devices 12 shown in FIG. 1, FIG. 6 and more. In addition, a servo valve and a shock-less valve, which gradually change the flow rate of the cleaning agent flowing inside the supply flow path 31, can be used as the supply valves 35C, 35D of the cleaning device 10.

As cleaning conditions related to the supply of the cleaning agent, for example, oil temperature of the cleaning agent can be set to 100 degrees Fahrenheit, the minimum value of the flow rate can be set to 8.0 GPM, maximal pressure of the cleaning agent can be set to 900 PSI, dust quantity (contamination level) can be set to less than a predetermined value (cleaner than CLASS 3), in the first process of tube cleaning (No. 1) and the second process of tube cleaning (No. 2). In addition, in the third process of tube cleaning (No. 3), the minimal value of the flow rate of the cleaning agent can be set to 6.0 GPM. In addition, in the fourth process of tube cleaning (No. 4), the minimal value of the flow rate of the cleaning agent can be increased to 10.0 GPM, since parallel portions exist in the tube. In addition, in the fifth process of tube cleaning (No. 5), the minimal value of the flow rate of the cleaning agent can be increased to 10.0 GPM, since the sectional area of the hydraulic oil tube to be cleaned is greater.

(Embodiment of Cleaning a Hydraulic Oil Tube Having Equipment Ends 97 at Both Ends)

Figure 17:
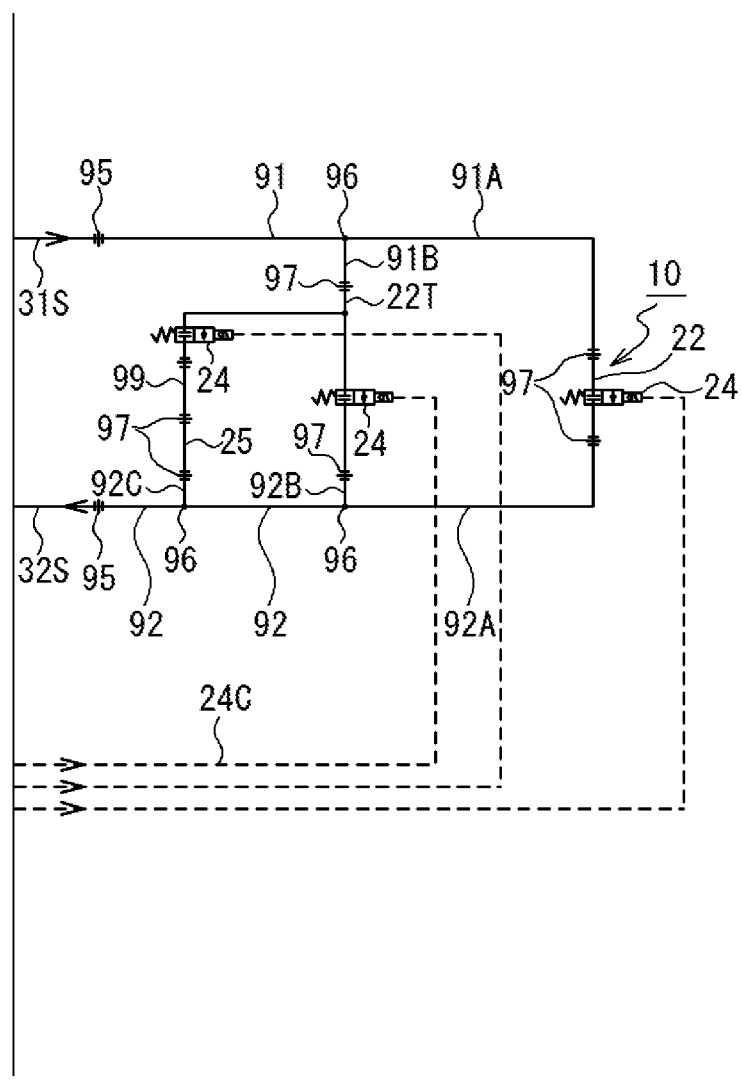
FIG. 17 is a diagram to briefly explain an example of connection of a hydraulic circuit of three systems of hydraulic oil tube including a sixth hydraulic oil tube having equipment ends at both ends, a valved connection tube, a multi-junction-valved connection tube, a connection tube on-off valve and a connection tube.

Next, with reference to FIG. 6 and FIG. 17, will be explained an embodiment of cleaning the sixth hydraulic oil tube 99 having equipment ends (connection ends) 97 at both ends. FIG. 17 is a diagram to briefly explain an example of connecting a hydraulic circuit of three systems of hydraulic oil tube including the sixth hydraulic oil tube 99 having equipment ends 97 at both ends, the cleaning agent circulation device 12 in the cleaning device 10, valved connection tubes 22, a multi-junction connection tube 22T, connection tube on-off valves 24 and a connection tube 25. It should be noted that parts having function similar to one of parts explained in FIG. 1, FIG. 2, FIG. 6, FIG. 10 or FIG. 12 to FIG. 14 are denoted with the same symbols and their explanation is omitted.

In a case in which the sixth hydraulic oil tube 99 having equipment ends 97 at both ends exists in a hydraulic oil tube of an aircraft, the valved connection tubes 22, the multi-junction connection tube 22T, the connection tube on-off valve 24 and the connection tube 25 are connected to perform cleaning, as shown in FIG. 17.

The hydraulic oil tube of the aircraft shown in FIG. 17 has a first hydraulic oil tube 91, 91A, 91B which has one T-junction 96, a second hydraulic oil tube 92, 92A, 92B, 92C which has two T-junctions 96 and the sixth hydraulic oil tube 99.

The multi-junction connection tube 22T (a configuration of a valved connection tube) has a first connection flow path, which connects between an equipment end (connection end) 97 of the first hydraulic oil tube 91B and an equipment end (connection end) 97 of the second hydraulic oil tube 92B, and a second connection flow path, which connects between an equipment end (connection end) 97 of the sixth hydraulic oil tube 99 and an equipment end (connection end) 97 of the first hydraulic oil tube 91B.

And, the connection tube on-off valve 24 is arranged in middles of a first connection flow path and a second connection flow path of the multi-junction connection tube 22T, respectively. The connection tube on-off valve 24 controls the flow rate of the cleaning agent flowing the first connection flow path and the second connection flow path, on a basis of the instruction of the control section 14.

In a case of performing an automatic cleaning of the hydraulic oil tube shown in FIG. 17, the equipment end (connection end) 97 communicating to the first hydraulic oil tube 91A and the equipment end (connection end) 97 communicating to the second hydraulic oil tube 92A by use of the valved connection tube 22. In addition, the equipment end (connection end) 97 communicating to the first hydraulic oil tube 91B, the equipment end (connection end) 97 communicating to the second hydraulic oil tube 92B and the equipment end (connection end) 97 communicating to one end of the sixth hydraulic oil tube 99 are connected by use of the multi-junction connection tube 22T. In addition, the equipment end (connection end) 97 communicating to another end of the sixth hydraulic oil tube 99 and the equipment end (connection end) 97 communicating to the second hydraulic oil tube 92C are connected by use of the connection tube 25.

Next, a connection of the cleaning agent circulation device 12 shown in FIG. 6 and the supply end 95 of the hydraulic oil tube shown in FIG. 17 will be explained.

The supply flow path 31S of the cleaning agent shown in FIG. 6 is connected to the supply end 95 of the first hydraulic oil tube 91 of the aircraft shown in FIG. 17. The return flow path 32S of the cleaning agent shown in FIG. 6 is connected to the supply end 95 of the second hydraulic oil tube 92 of the aircraft shown in FIG. 17.

The hydraulic oil tube shown in FIG. 17 can perform an automatic cleaning, by the opening and closing control of each communication tube on-off valve 24 performed by use of the control section 14. For example, at the first process of tube cleaning, the first hydraulic oil tube 91, 91A and the second hydraulic oil tube 92, 92A are cleaned. At the next second process of tube cleaning, the first hydraulic oil tube 91, 91B and the second hydraulic oil tube 92, 92B are cleaned. At the next third process of tube cleaning, the first hydraulic oil tube 91, 91B, the sixth hydraulic oil tube 99 and the second hydraulic oil tube 92, 92C are cleaned. It should be noted that the opening and closing operations of connection tube on-off valve 24 of the multi-junction connection tube 22T to be switched when performing the cleaning of the sixth hydraulic oil tube 99 are described with the communication tube on-off valve 24 (L-2, L-3) shown in FIG. 19 and FIG. 20 and the communication tube on-off valve 24 (R-2, R-3) shown in FIG. 19 and FIG. 23.

As described above, the hydraulic oil tube of the aircraft shown in FIG. 17 can be automatically cleaned by use of the cleaning agent circulation device 12 shown in FIG. 6.

(Embodiment 1 of Cleaning a Hydraulic Oil Tube of an Actual Aircraft)

Next, with reference to FIG. 10, FIG. 11, FIG. 14, FIG. 15 and FIG. 18 to FIG. 20, will be explained an embodiment of cleaning hydraulic oil tube of an actual aircraft. For example, all of hydraulic oil tube shown in FIG. 10, FIG. 14 and FIG. 19 are supposed to be installed in the aircraft.

Figure 18:
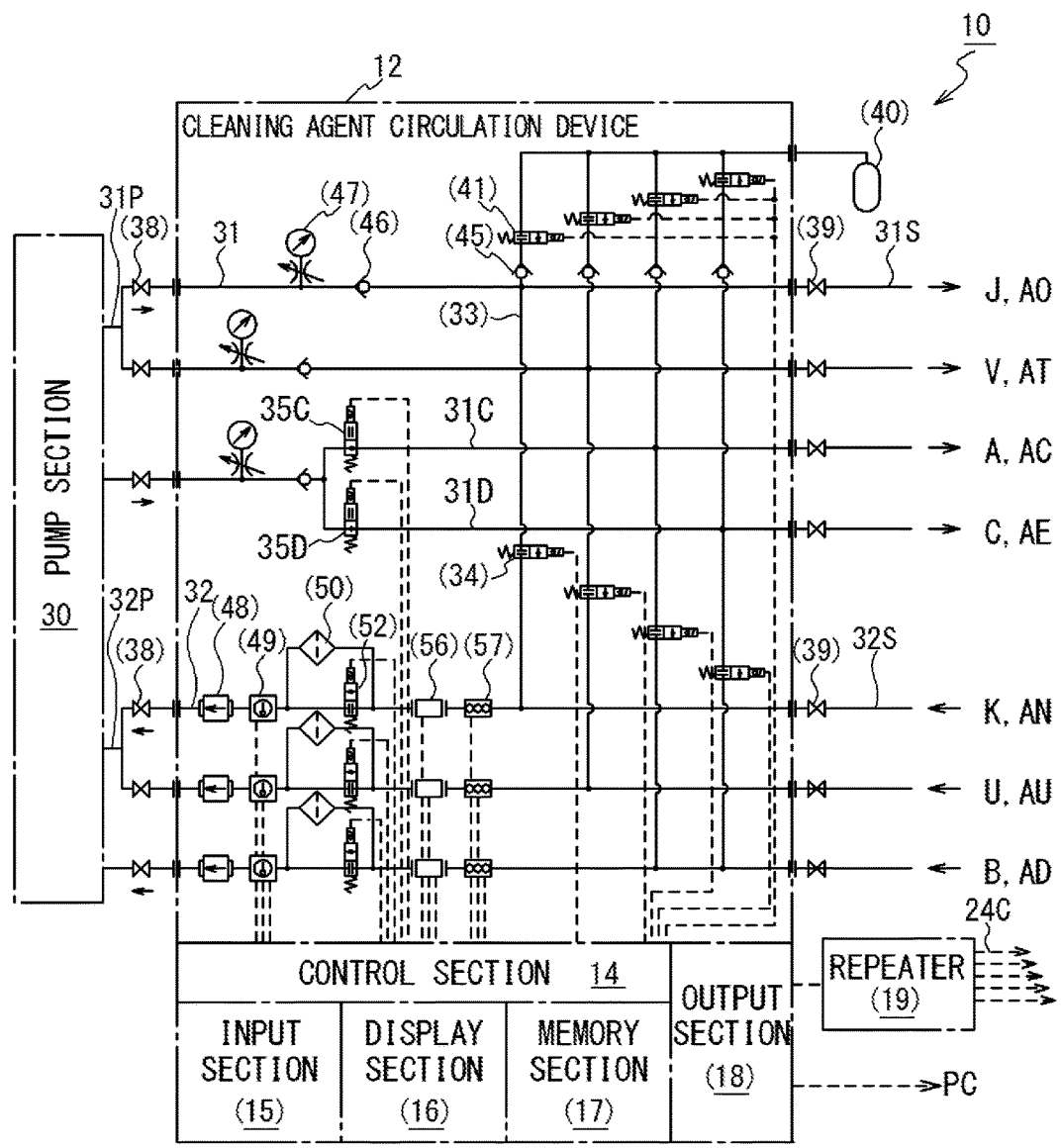
FIG. 18 is a diagram to explain a cleaning agent circulation device having four systems of supply flow path and three systems of return flow path.

FIG. 18 is a diagram to explain a cleaning agent circulation device 12 having four systems of supply flow path 31 and three systems of return flow path 32. By use of the cleaning agent circulation device 12 shown in FIG. 18, all of the hydraulic oil tube shown in FIG. 10, FIG. 14 and FIG. 19 can sequentially be automatically cleaned in a single setup.

Figure 19:
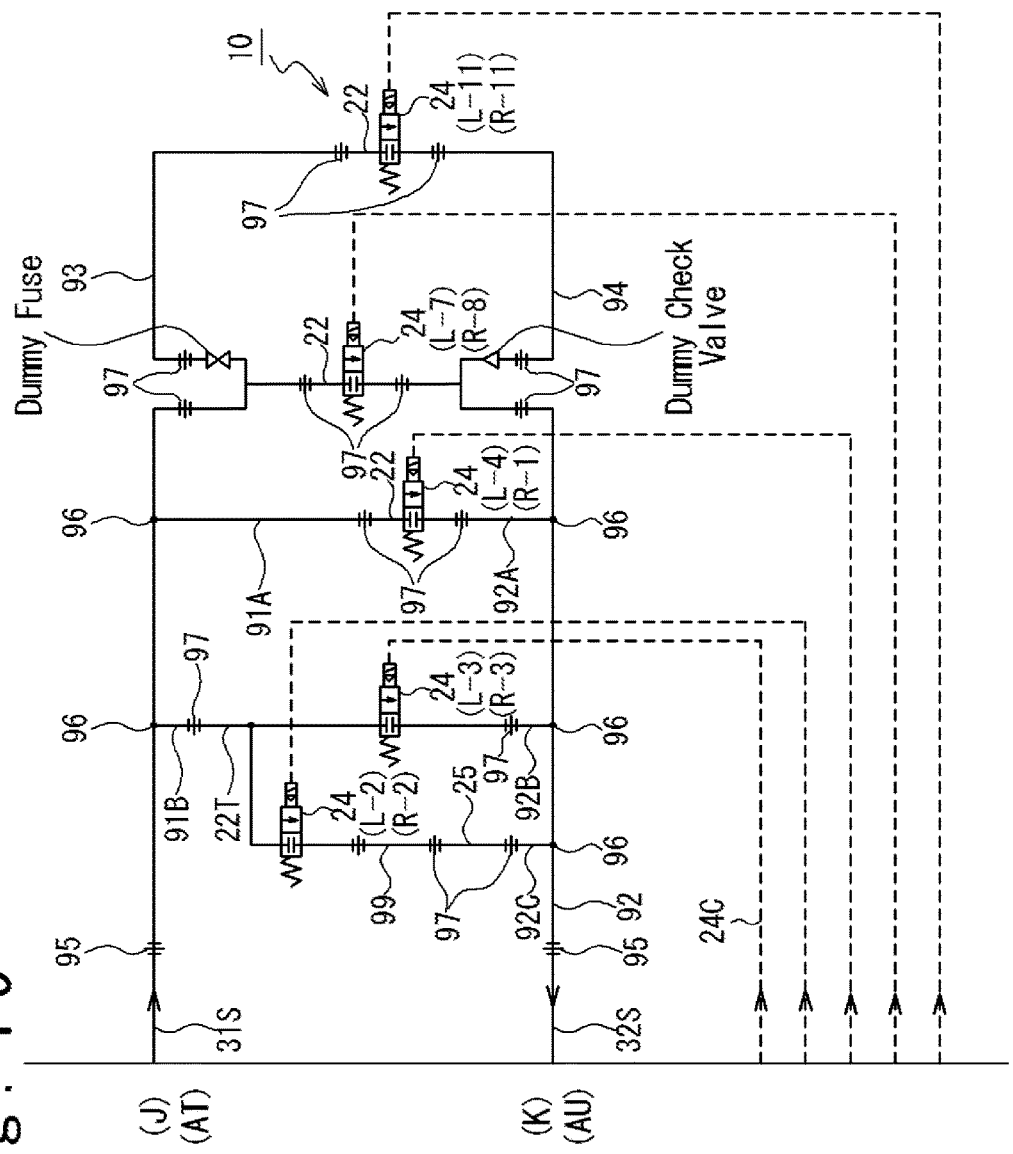
FIG. 19 is a diagram to briefly explain an example of connection of a hydraulic circuit of five systems of hydraulic oil tube including the sixth hydraulic oil tube having equipment ends at both ends, a valved connection tube, a multi-junction-valved connection tube, a junction connection tube, a connection tube on-off valve and a connection tube.

FIG. 19 is a diagram to briefly explain an example of connecting a hydraulic circuit of a hydraulic oil tube of a part on the side of the aircraft to be cleaned, valved connection tubes 22, a multi-junction connection tube 22T, a junction connection tube 23, connection tube on-off valve 24 and a connection tube 25.

FIG. 20 is a table diagram to explain opening and closing operations of the connection tube on-off valve 24 when cleaning the hydraulic oil tube shown in FIG. 19. It should be noted that parts having functions same as one of parts explained in FIG. 1 to FIG. 17 are denoted with same symbols and their explanations are omitted.

The cleaning agent circulation device 12 shown in FIG. 18 has four systems of supply flow path 31 and three systems of return flow path 32. The hydraulic oil tube on the side of the aircraft to be cleaned, included in FIG. 10, FIG. 14 and FIG. 19 has seven systems, which are Center (with reference to FIG. 14), Left (with reference to FIG. 19) and Right (with reference to FIG. 10), of supply ends 95 (four systems of Press ports A, C, J, V and three systems of Ret ports B, K, U). Those hydraulic oil tube have a total of twenty nine equipment ends (connection ends) 97. In the hydraulic oil tube are included various elbows, joints, junctions and fittings to pass through partition walls. In addition, if necessary, a dummy fuse and a dummy check valve can be arranged in the junction connection tube 23 or the like.

Even a complex group of hydraulic oil tube including FIG. 10, FIG. 14 and FIG. 19, all hydraulic oil tube can be automatically cleaned by a single connection with the cleaning agent circulation device 12 shown in FIG. 18. For example, in a case of automatically cleaning a group of hydraulic oil tube including FIG. 10, FIG. 14 and FIG. 19, at first the operator performs operations of steps S10 to S14 shown in FIG. 3 and FIG. 4. After that, the cleaning of the hydraulic oil tube of steps S16 to S26 is automatically and repeatedly performed for each of Center (with reference to FIG. 14 and FIG. 15), Left (with reference to FIG. 19 and FIG. 20) and Right (with reference to FIG. 10 and FIG. 11), from the first tube to the n-th tube, on a basis of instructions from the control section 14.

In a case in which the automatic cleaning is finished for all hydraulic oil tube, the operator performs operations of steps S28 to S30 shown in FIG. 3 and then the cleaning of the hydraulic oil tube is finished.

For example, in a case of performing five times the tube cleaning process of Center (with reference to FIG. 14 and FIG. 15), five times of tube cleaning process of Left (with reference to FIG. 19 and FIG. 20) and four times of tube cleaning process of Right (with reference to FIG. 10 and FIG. 11), the cleaning can be finished within a time adding fourteen times the cleaning time (T1+T2) with purging time and respective switching time T3.

(Embodiment 2 of Cleaning Hydraulic Oil Tube of an Actual Aircraft)

Next, with reference to FIG. 2, FIG. 5, FIG. 18, FIG. 19 and FIG. 21 to FIG. 23, will be explained an embodiment of cleaning a hydraulic oil tube of an actual aircraft. For example, all of hydraulic oil tube shown in FIG. 2, FIG. 19 and FIG. 21 are supposed to be installed in the aircraft.

FIG. 18 is a diagram to explain the cleaning agent circulation device 12 having four systems of supply flow path 31 and three systems of return flow path 32. By use of the cleaning agent circulation device 12 shown in FIG. 18, all of hydraulic oil tube shown in FIG. 2, FIG. 19 and FIG. 21 can be sequentially and automatically cleaned within a single setup.

Figure 21:
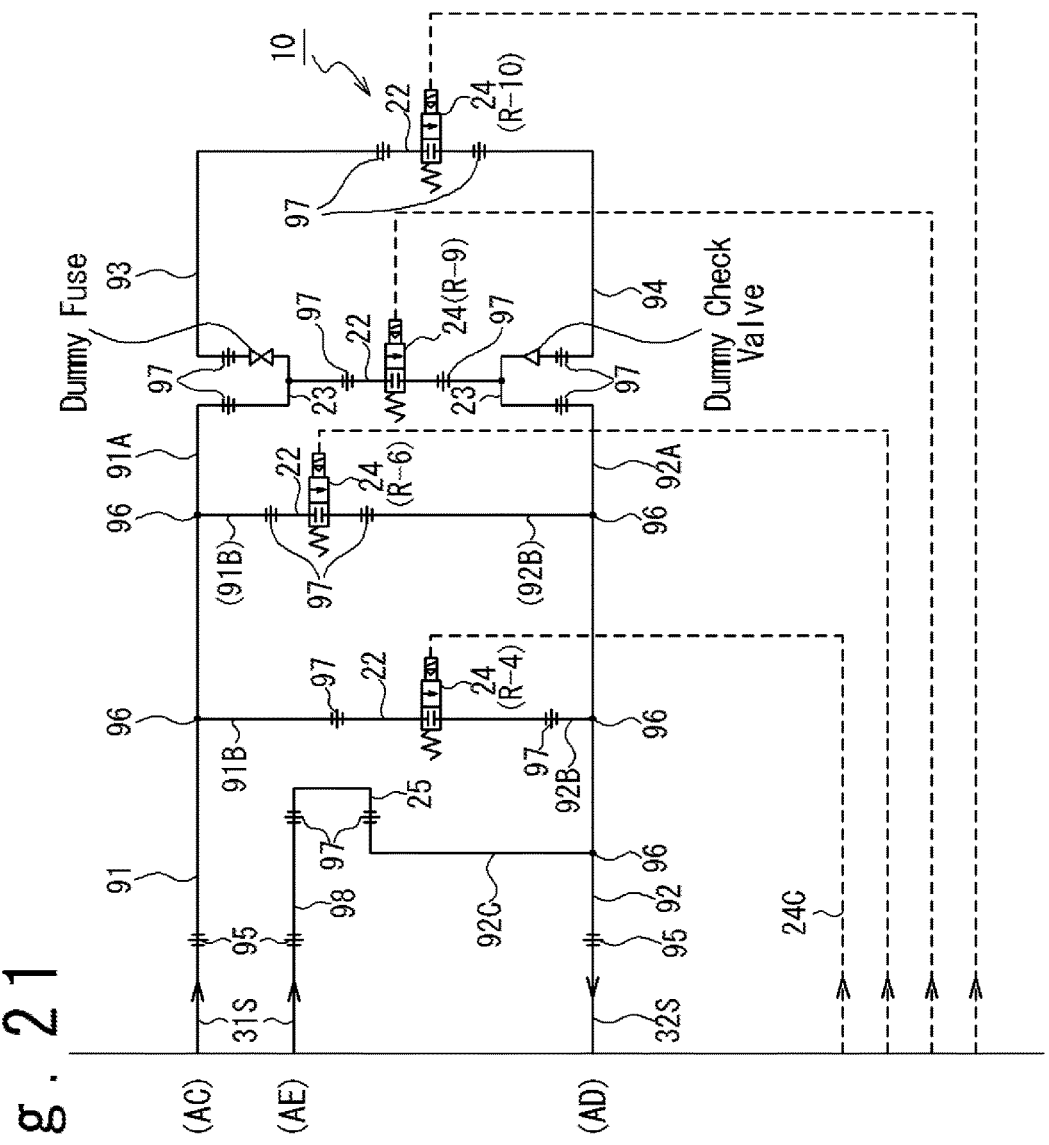
FIG. 21 is a diagram to briefly explain an example of connection of a hydraulic circuit of five systems of hydraulic oil tube at an aircraft to be cleaned, a valved connection tube, a junction connection tube, a connection tube on-off valve and a connection tube.

FIG. 21 is a diagram to briefly explain an example of connecting a hydraulic circuit of the hydraulic oil tube on the side of the aircraft to be cleaned, valved connection tubes 22, junction connection tubes 23, connection tube on-off valves and a connection tube 25. FIG. 22 is a table diagram to explain opening and closing operations of connection tube on-off valve 24 when cleaning hydraulic oil tube of Center (with reference to FIG. 21), Left (with reference to FIG. 2) and Right (with reference to FIG. 19). It should be noted that parts having functions similar to one of parts explained in FIG. 1 to FIG. 17 are denoted with same symbols and their explanations are omitted.

The hydraulic oil tube on the side of the aircraft to be cleaned, including FIG. 2, FIG. 19 and FIG. 21 has seven systems, which are Center (with reference to FIG. 21), Left (with reference to FIG. 2) and Right (with reference to FIG. 19), of supply ends 95 (four systems of Press ports AC, AE, AO, AT and three systems of Ret ports AD, AN, AU). Those hydraulic oil tube have a total of twenty nine equipment ends (connection ends) 97. In the hydraulic oil tube are included various elbows, joints, junctions and fittings to pass through partition walls, and the like.

Even a complex group of hydraulic oil tube including FIG. 2, FIG. 19 and FIG. 21, all hydraulic oil tube can be automatically cleaned by a single connection with the cleaning agent circulation device 12 shown in FIG. 18. For example, in a case of automatically cleaning a group of hydraulic oil tube including FIG. 2, FIG. 19 and FIG. 21, at first the operator performs operations of steps S10 to S14 shown in FIG. 3 and FIG. 4. After that, the cleaning of the hydraulic oil tube of steps S16 to S26 is automatically and repeatedly performed for each of Center (with reference to FIG. 21 and FIG. 22), Left (with reference to FIG. 2 and FIG. 5) and Right (with reference to FIG. 19 and FIG. 23), from the first tube to the n-th tube, on a basis of instructions from the control section 14.

In a case in which the automatic cleaning is finished for all hydraulic oil tube, the operator performs operations of steps S28 to S30 shown in FIG. 3 and then the cleaning of the hydraulic oil tube is finished.

For example, in a case of performing seven times the tube cleaning process of Center (with reference to FIG. 21 and FIG. 22), three times of tube cleaning process of Left (with reference to FIG. 2 and FIG. 5) and five times of tube cleaning process of Right (with reference to FIG. 19 and FIG. 23), the cleaning can be finished within a time adding fifteen times the cleaning time (T1+T2) with purging time and respective switching time T3.

It is clear that the present invention is not limited to each of above embodiments and that each embodiment can be appropriately transformed or modified within the scope of the technical idea of the present invention. In addition, various techniques used in each of embodiment or variation are applicable to other embodiment or variation unless technical contradiction occurs.

The present invention claims priority based on Japanese patent application No. 2014-148001 filed on Jul. 18, 2014 and the present invention incorporates by reference all of the disclosure of the basic application.

The invention claimed is:

1. A cleaning device configured to simultaneously clean a first hydraulic oil tube and a second hydraulic oil tube of an aircraft, the cleaning device comprising:

a cleaning agent circulation device comprising:
   a cleaning agent supply flow path configured to be connectable to a supply end of the first hydraulic oil tube included in a first hydraulic system; and
   a cleaning agent return flow path configured to be connectable to a supply end of the second hydraulic oil tube included in a second hydraulic system different from the first hydraulic system;
a valved connection tube configured to be arrangeable between a connection end of the first hydraulic oil tube and a connection end of the second hydraulic oil tube and configured to be fluidly connectable between the first hydraulic oil tube and the second hydraulic oil tube;
a connection tube on-off valve arranged in a flow path of the valved connection tube;
a control section;
a bypass flow path; and
a bypass valve,
wherein the connection tube on-off valve controls a flow rate of a cleaning agent flowing through the valved connection tube on a basis of an instruction from the control section,
wherein the bypass flow path is configured to connect between the cleaning agent supply flow path and the cleaning agent return flow path,
wherein the bypass valve is arranged in the bypass flow path and configured to control the flow rate of the cleaning agent flowing through the bypass flow path on a basis of an instruction from the control section, and
wherein the control section is configured to perform a control of:
   opening the connection tube on-off valve to realize a state in which the cleaning agent flows through the valved connection tube;
   opening the bypass valve, in the realized state, to flow the cleaning agent through the bypass flow path; and
   closing the connection tube on-off valve to block the cleaning agent which was flowing through the valved connection tube.

2. The cleaning device according to claim 1, further comprising:
another valved connection tube,
wherein the other valved connection tube is configured to be fluidly connectable between a first junction of the first hydraulic oil tube and a first junction of the second hydraulic oil tube, and
wherein another connection tube on-off valve is configured to be fluidly connectable between a second junction of the first hydraulic oil tube and a second junction of the second hydraulic oil tube.

3. The cleaning device according to claim 1, further comprising:
a first junction connection tube and a second junction connection tube; and
a second valved connection tube,
wherein the valved connection tube is configured to be connectable to the connection end of the first hydraulic oil tube via the first junction connection tube;
wherein the valved connection tube is configured to be connectable to the connection end of the second hydraulic oil tube via the second junction connection tube;
wherein the second valved connection tube is configured to be connectable to the first junction connection tube via a third hydraulic oil tube of the aircraft; and
wherein the second valved connection tube is configured to be connectable to the second junction connection tube via a fourth hydraulic oil tube of the aircraft.

4. The cleaning device according to claim 1,
further comprising a connection tube configured to be connectable between a connection end of a third hydraulic oil tube of the aircraft and another connection end of the second hydraulic oil tube which has a T-junction.

5. The cleaning device according to claim 1,
further comprising a connection tube configured to be connectable between a connection end of a third hydraulic oil tube of the aircraft and another connection end of the second hydraulic oil tube which has a T-junction,
wherein the valved connection tube comprises: a first connection flow path connectable between the connection end of the first hydraulic oil tube and the connection end of the second hydraulic oil tube; and a second connection flow path connectable between another connection end of the sixth hydraulic oil tube and the connection end of the first hydraulic oil tube,
wherein the connection tube on-off valve is arranged in the first connection flow path, and
wherein the another connection tube on-off valve is arranged in the second connection flow path.

6. The cleaning device according to claim 1,
wherein the control section is configured to perform a control of: opening the bypass valve to realize a state in which the cleaning agent flows through the bypass flow path; opening the connection tube on-off valve, in the realized state, to flow the cleaning agent through the valved connection tube; and closing the bypass valve to block the cleaning agent which was flowing through the bypass flow path.

7. The cleaning device according to claim 1,
wherein the bypass valve is a servo valve or a shock-less valve and is configured to gradually change the flow rate of the cleaning agent which flows through the bypass flow path.

8. The cleaning device according to claim 1,
wherein the connection tube on-off valve is a servo valve or a shock-less valve and is configured to gradually change the flow rate of the cleaning agent which flows inside the valved connection tube.

9. The cleaning device according to claim 1, further comprising a supply valve arranged in the cleaning agent supply flow path and configured to control a supply of the cleaning agent.

10. The cleaning device according to claim 9,
wherein the supply valve is a servo valve or a shock-less valve and is configured to gradually change the flow rate of the cleaning agent which flows inside the cleaning agent supply flow path.

11. The cleaning device according to claim 1, further comprising:
a filter valve arranged in the cleaning agent return flow path; and
a filter arranged in parallel with the filter valve and configured to collect a dust during cleaning.

12. The cleaning device according to claim 1, further comprising:
a repeater configured to relay a control line which transmits a control signal between the cleaning agent circulation device and the connection tube on-off valve.

13. The cleaning device according to claim 1, further comprising:

a purge valve configured to control a supply of a purge agent to the cleaning agent supply flow path; and a purge check valve arranged in the cleaning agent supply flow path and configured to prevent regurgitation of the purge agent.

14. A method of cleaning a hydraulic oil tube of an aircraft by use of a cleaning device configured to simultaneously clean a first hydraulic oil tube and a second hydraulic oil tube of the aircraft, the cleaning device comprising:
- a cleaning agent circulation device comprising:
  - a cleaning agent supply flow path configured to be connectable to a supply end of the first hydraulic oil tube included in a first hydraulic system; and
  - a cleaning agent return flow path configured to be connectable to a supply end of the second hydraulic oil tube included in a second hydraulic system different from the first hydraulic system;
- a valved connection tube configured to be arrangeable between a connection end of the first hydraulic oil tube and a connection end of the second hydraulic oil tube and configured to be fluidly connectable between the first hydraulic oil tube and the second hydraulic oil tube;
- a connection tube on-off valve arranged in a flow path of the valved connection tube;
- a control section;
- a bypass flow path; and
- a bypass valve, wherein the connection tube on-off valve controls a flow rate of a cleaning agent flowing through the valved connection tube on a basis of an instruction from the control section, wherein the bypass flow path is configured to connect between the cleaning agent supply flow path and the cleaning agent return flow path, wherein the bypass valve is arranged in the bypass flow path and configured to control the flow rate of the cleaning agent flowing through the bypass flow path on a basis of an instruction from the control section, and wherein the control section is configured to perform a control of: opening the connection tube on-off valve to realize a state in which the cleaning agent flows through the valved connection tube; opening the bypass valve, in the realized state, to flow the cleaning agent through the bypass flow path; and closing the connection tube on-off valve to block the cleaning agent which was flowing through the valved connection tube, the method comprising:
- connecting the supply end of the first hydraulic oil tube included in the first hydraulic system to the cleaning agent supply flow path of the cleaning agent circulation device;
- connecting the supply end of the second hydraulic oil tube included in the second hydraulic system to the cleaning agent return flow path of the cleaning agent circulation device;
- connecting the connection end of the first hydraulic oil tube and the connection end of the second hydraulic oil tube via the valved connection tube;
- opening the connection tube on-off valve arranged in the flow path of the valved connection tube;
- supplying the cleaning agent to the cleaning agent supply flow path to simultaneously clean the first hydraulic oil tube and the second hydraulic oil tube;
- opening the bypass valve to flow the cleaning agent through the bypass flow path; and
- closing the connection tube on-off valve to block the cleaning agent which was flowing through the valved connection tube.

15. The cleaning device according to claim 1,
wherein the control section is configured to perform a control of:
- opening the bypass valve if the cleaning agent does not flow through the bypass flow path;
- opening the connection tube on-off valve, to flow the cleaning agent through the valved connection tube; and
- closing the bypass valve to block the cleaning agent which was flowing through the bypass flow path.

* * * * *